(12) United States Patent
Wang et al.

(10) Patent No.: US 8,065,317 B2
(45) Date of Patent: Nov. 22, 2011

(54) USER-CENTRIC SERVICE PROVIDING DEVICE AND SERVICE PROVIDING METHOD

(75) Inventors: Hao Wang, Beijing (CN); Shih-Gong Li, San Jose, CA (US); Li Wei, Beijing (CN); Song Song, Beijing (CN); Chun Ying, Beijing (CN); Xiao Xi Liu, Beijing (CN); Yao Fu Rong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 10/541,368

(22) PCT Filed: Dec. 15, 2003

(86) PCT No.: PCT/GB03/05483
§ 371 (c)(1),
(2), (4) Date: Jul. 24, 2006

(87) PCT Pub. No.: WO2004/061660
PCT Pub. Date: Jul. 22, 2004

(65) Prior Publication Data
US 2006/0265483 A1 Nov. 23, 2006

(30) Foreign Application Priority Data

Jan. 6, 2003 (CN) .................................. 03 1 01003
Jan. 6, 2003 (CN) .................................. 03 1 01004

(51) Int. Cl.
*G06F 7/00* (2006.01)
*G06F 17/30* (2006.01)

(52) U.S. Cl. ........................................ 707/769; 709/223
(58) Field of Classification Search .................. 709/223; 707/769
See application file for complete search history.

(56) References Cited

U.S. PATENT DOCUMENTS

| 6,408,061 | B1 * | 6/2002 | Donak et al. | 379/188 |
| 2004/0003132 | A1 * | 1/2004 | Stanley et al. | 709/316 |
| 2007/0053518 | A1 * | 3/2007 | Tompkins et al. | 380/270 |

* cited by examiner

*Primary Examiner* — Apu Mofiz
*Assistant Examiner* — Mohammad Rahman
(74) *Attorney, Agent, or Firm* — Michael J. Buchenhorner; Vazken Alexanian

(57) ABSTRACT

Provides a service providing device and method enabling a user to accept the service by utilizing the capabilities of several various devices. At least one physical device is selected for the user based on the service requirement. The user accepts the service via the selected physical device or devices. The invention "hides" the physical devices by using a virtual device to provide the service for users. Furthermore, the invention provides a "tailored" virtual device based on the environment around the user, the favorite of user and the requirements of the service, and may provide to the user the "tailored" information suitable for the user. The operating environment of the virtual device according to the invention is dynamically changeable according to the environment around the user, the favorite of user and the requirements of the service. Thus, a seamless service may be provided to the user.

8 Claims, 24 Drawing Sheets

USER-CENTRIC SERVICE PROVIDING DEVICE AND SERVICE PROVIDING METHOD

CROSS-REFERENCE TO RELATED APPLICATIONS

This application filed under 35 USC 371, is cross-referenced with, and claims priority from, International Patent Application PCT/GB2003/05483 filed on 15 Dec. 2003, and not yet published under PCT article 21(2), which in turn claims priority of 03101004.0 and 03101003.2 filed in China, on 6 Jan. 2003.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

None.

FIELD OF THE INVENTION

The present invention relates to a user-oriented service providing device and a service providing method, particularly relates to a service providing device and a service providing method enabling a user to accept the services by utilizing the capabilities of a plurality of devices.

BACKGROUND OF THE INVENTION

Recently, in addition to the conventional computers, there are many terminals providing capabilities of processing and communications, such as personal digital assistants (PDA), mobile phones, vehicles equipments, computer peripheral equipments (e.g. printers, facsimiles, etc.) and so forth.

The current situation is that all the present service providers provide services to the users based on the so-called "device-oriented" service providing form. That is, the users usually accept certain services specified for the device by means of the functionalities of some individual terminals. For example, the users listen to the phone calls by means of the mobile phones; do text editing by means of PDA and so on.

It can be anticipated that in near future there will be more terminals having various kinds of functionalities to be selected and used by the users. Thus the users have much more choices.

But the above-mentioned "device-oriented" service providing form may have a big problem: on one hand, it is necessary to provide the inter-ware used to realize the corresponding service functionalities for various kinds of terminals; on the other hand, the service provider must spend much effort and cost in providing supporting functionalities for more new terminals.

In addition, although the users can possess a plurality of terminals, but due to the limitation of various terminals, the users have to endure the services of low quality such as small screen size, low speed linking and bad sound and image quality.

Moreover, even though a user may have a lot of terminals, when a terminal is being used, the user is prevented from performing more sophisticated tasks due to the limited capabilities of his terminals, even at that time the user still has other devices having the capabilities of performing the functionalities.

SUMMARY OF THE INVENTION

Thus, the above problem can be solved if it is possible to combine the available capabilities of various kinds of devices to build a "virtual" device for providing the services comprehensively for a user.

To solve the above existing technical problem, one object of the present invention is to provide a virtual device, wherein one virtual device is provided for each user who accepts the services and the user accepts services from the service providers by means of this virtual device.

Another object of the present invention is to provide a service providing method, wherein the method selects an available physical device or a combination of the physical devices for the user based on the service requirements and the user accepts services from the service providers by means of the selected physical device or the combination of the physical devices.

To achieve the above objects, the present invention provides a service providing device for providing services for the users, wherein the service providing device utilizes many physical devices available to the users to provide service information for the users, the service providing device includes: an interface portion connected with a user and a physical device management portion which manages the information related to user and the information related to the physical devices available to the user; a monitoring portion for obtaining the information of the managed physical devices and/or of the users via said interface portion; a negotiating portion communicating with a service provider and selecting a service type for the user from the service types of the services provided by the service provider; a service processing portion communicating with the service provider and transferring the service information of the service type to be interchanged between the user and the service provider; a service information redistributing portion for receiving the service information supplied by the service provider to user and transferred by said service processing portion, and for distributing the service information to the corresponding physical device and/or the combination of the physical devices based on the capabilities of the physical devices needed by the selected service type; a controlling portion for controlling the operation of transferring information among the above-mentioned portions.

The present invention provides a service providing method for providing a service for a user, wherein the service providing method provides service for user by means of a plurality of physical devices available to the user, the service providing method comprising: receiving a service request sent from a user to a service provider via a physical device, or receiving a request of a service provider for providing a service to a user; obtaining the information related to the user and the information related to the physical devices available to the user; selecting one service type from the service types of the services that can be provided by the service provider; distributing the service information, sent from the service provider to the user, to the corresponding physical device and/or the combination of physical devices based on the physical device capabilities needed by the service type.

Another object of the present invention is to provide a sentient network generating device and a sentient network generating method, wherein a sentient network is constructed for each user, the sentient network is a combination of the user and the devices available to the user. The sentient network constructed for the user is dynamically changeable with the change of the favorite of user and the user environment.

Another object of the present invention is to provide a service providing device and a service providing method enabling a user to accept the service by utilizing the capabilities of several various devices.

A further object of the present invention is to provide a communication agent device, so that various devices can provide processing ability for the user broadcast their own status information via the agent device.

To achieve the above objects, the present invention provides a sentient network generating device, the sentient network including a user object and one or more device objects available to the user object, the sentient network generating device comprising: a user management portion for receiving the registration request of at least one user and for building the user object(s) for the user(s); a device management portion for receiving the registration request of at least one device and for building the device object(s) for the device(s); an associating portion for associating a user object with at least one of the device object(s) to generate a sentient network.

The present invention further provides a sentient network generating method, the sentient network including a user object and one or more device objects available to the user object, the sentient network generating method comprising: receiving the registration request from at least one user and building the user object(s) for the user(s); receiving the registration request from at least one device and building the device object(s) for the device(s); associating a user object with at least one of the device objects to form a sentient network.

The present invention provides a service providing system, comprising a sentient network generating device and a service providing device built for each user, wherein the service providing device for each user provides service information for the user by utilizing at least one available physical devices determined by the sentient network generating device for the user, the sentient network generating device comprising: a user management portion for receiving the registration request from at least one user and for storing the user information; a physical device management portion for receiving the registration request from at least one device and for storing the device information; an associating portion for associating a user with at least one of the physical devices to generate a sentient network, the service providing device for each user comprising: an interface portion connected to the sentient network generating device and used for receiving or transmitting the information from/to the sentient network generating device; a monitoring portion for obtaining from the sentient network, via the interface portion, the physical device information associated by the sentient network generating device for the user; a negotiating portion communicating with the service providers and selecting one service type for the user from the service types of the services provided by the service providers; a service processing portion communicating with the service providers and transferring the service information of the service type to be interchanged between the user and the service providers; a service information redistributing portion for receiving the service information supplied by the service providers to the user and transferred by the service processing portion, and for distributing the service information to the corresponding associated physical device and/or the combination of the physical devices based on the capabilities of the physical devices needed by the selected service type; a controlling portion for controlling the operation of transferring information among the above-mentioned portions.

The present invention provides a service providing method for providing services for a user, comprising a sentient network generating step and a step of providing services for the user, wherein the service providing step provides service information for the user by utilizing at least one of the available physical devices determined by the sentient network generating step for the user, the sentient network generating step comprising: a user management step for receiving the registration request from at least one user and for storing the user information; a physical device management step for receiving the registration request from at least one physical device, and for storing the physical device information; an associating step for associating a user with at least one of the physical devices to generate a sentient network; for each user, the service providing step comprising: receiving a service request sent from a user to a service provider or receiving a request for providing a service sent from a service provider to a user; obtaining the physical devices information associated by the sentient network generating step for the user; selecting one service type from the service types of the services that can be provided by the service providers; distributing the service information supplied by the service provider to the user to the corresponding associated physical device/combination of physical devices based on the physical devices capability needed by the service type.

The invention collects the information about the user, the devices and the environment from different information resources, and associates various available device information related to a user and stores them so as to provide a base for sharing the resources.

The invention provides services for user by using a virtual device so as to "hide" the physical devices. Therefore the users and the service providers do not have to be concerned with what concrete devices are used for the users to accept the services, the users only have to be concerned with what kind of services they themselves need, and the service providers only have to be concerned with which services with specialities they themselves can provide, and the interaction between them is realized by means of the virtual device, thus a real user-oriented service can be provided.

Furthermore, as the present invention can provide a "tailored" virtual device based on the environment around the user, the favorite of the user and the requirements of the service, therefore the invention may provide the "tailored" information suiting the user.

Moreover, the operating environment of the virtual device according to the invention is dynamically changeable according to the environment around the user, the favorite of the user and the requirements of the service, and therefore a seamless service may be provided to the user.

BRIEF DESCRIPTION OF THE SEVERAL VIEWS OF THE DRAWINGS

These and other advantages of the invention will be more apparent from the following detailed description of the preferred embodiments of the present invention with reference to the accompanying drawings.

DETAILED DESCRIPTION OF THE INVENTION

Figure 1:
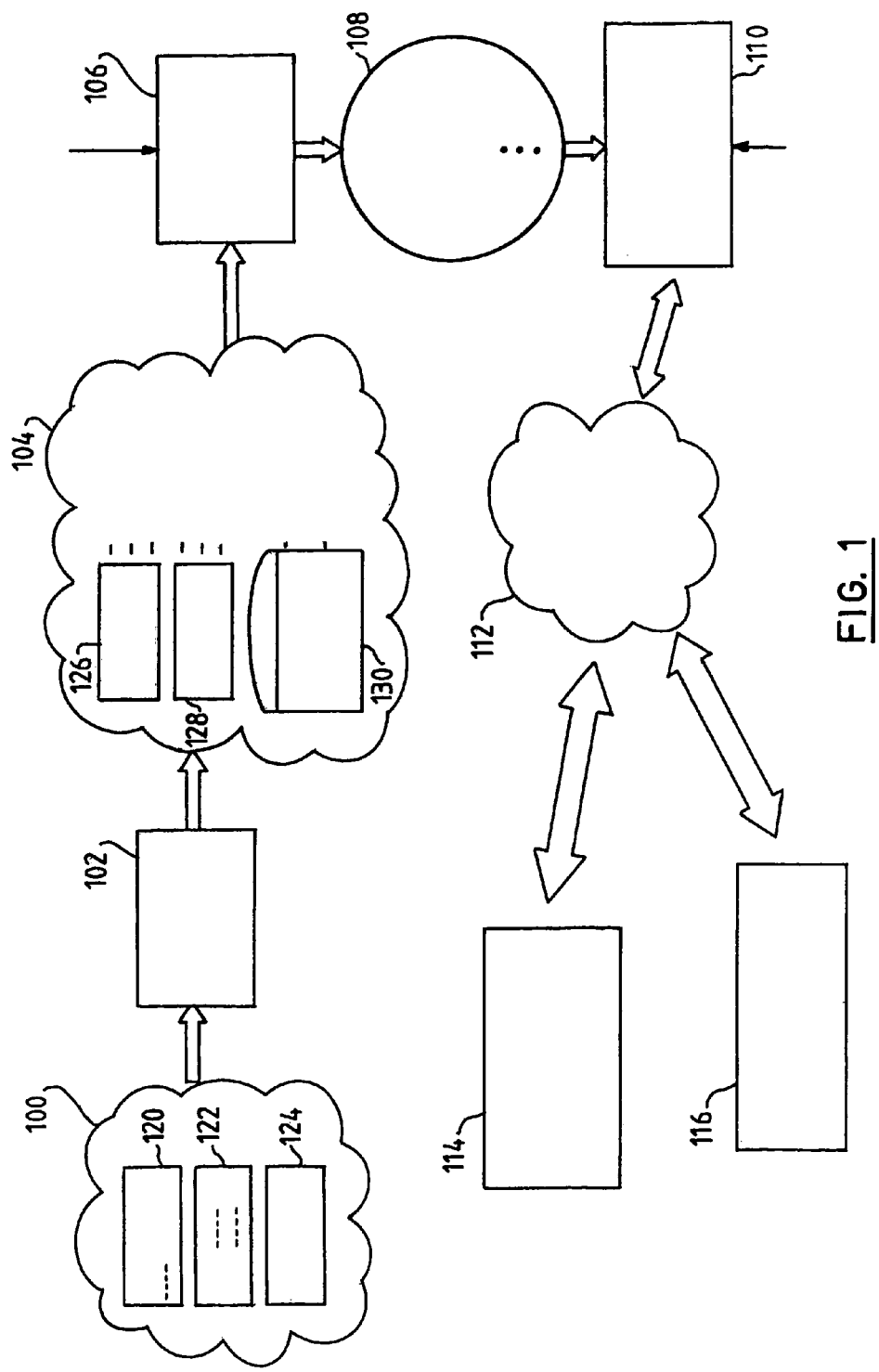
FIG. 1 shows a conceptual graph of the service providing system according to the present invention.

FIG. 1 shows a conceptual graph of the service providing system of the present invention. The service providing system of the present invention constructs a virtual device for each user based on the physical object of the real world such as the user and the physical devices; and the service providing system of the present invention can further collect the information of the surrounding environment of each user, mainly the user-related environment information in space. The user accepts the services of the service providers via the constructed virtual device. The term "user(s)" used in the present invention includes not only the people in the real world, but also the entities including the animals. The term "device(s)" used in the present invention includes all the physical devices capable of providing communication services for the users.

Below the process in FIG. 1 will be explained briefly.

Firstly, the physical objects in the real world 100 such as the users 122, . . . , 122 and the physical devices 120, . . . ,120 are preliminarily logged on to the system. Besides, preferably, the information of the environment 124 related to each user is collected too (102).

Thereafter, the system extracts the useful information from the logged-on information, generates a device object 126 and a user object 128 for each logged-on device and user, and stores the collected environment information into the environment information database 130. The user object, the device object and/or the environment information database construct a virtual world 104.

Then the system associates the user object of the user with one or more related available device object (106) so as to build a sentient network (SN) 108 for the user. If needed, the system of the present invention will build a sentient network for the user object of each logged-on user. The constructional factors of the sentient network include a user object and one or more available device objects related to the user object.

When the user object accepts the services or when the service providers provide the services, the system builds a virtual device (VD) for the user, and builds a virtual device (VD) operating environment 112 based on the parameter such as the service features or requirements and/or the user requirements (110). Thus the user is able to access the service providers 114, 116 or accept services from them in the virtual device (VD) operating environment 112 via the virtual device (VD).

Below it will be explained in details how the information providing system of the present invention implements the above process.

Figure 2:
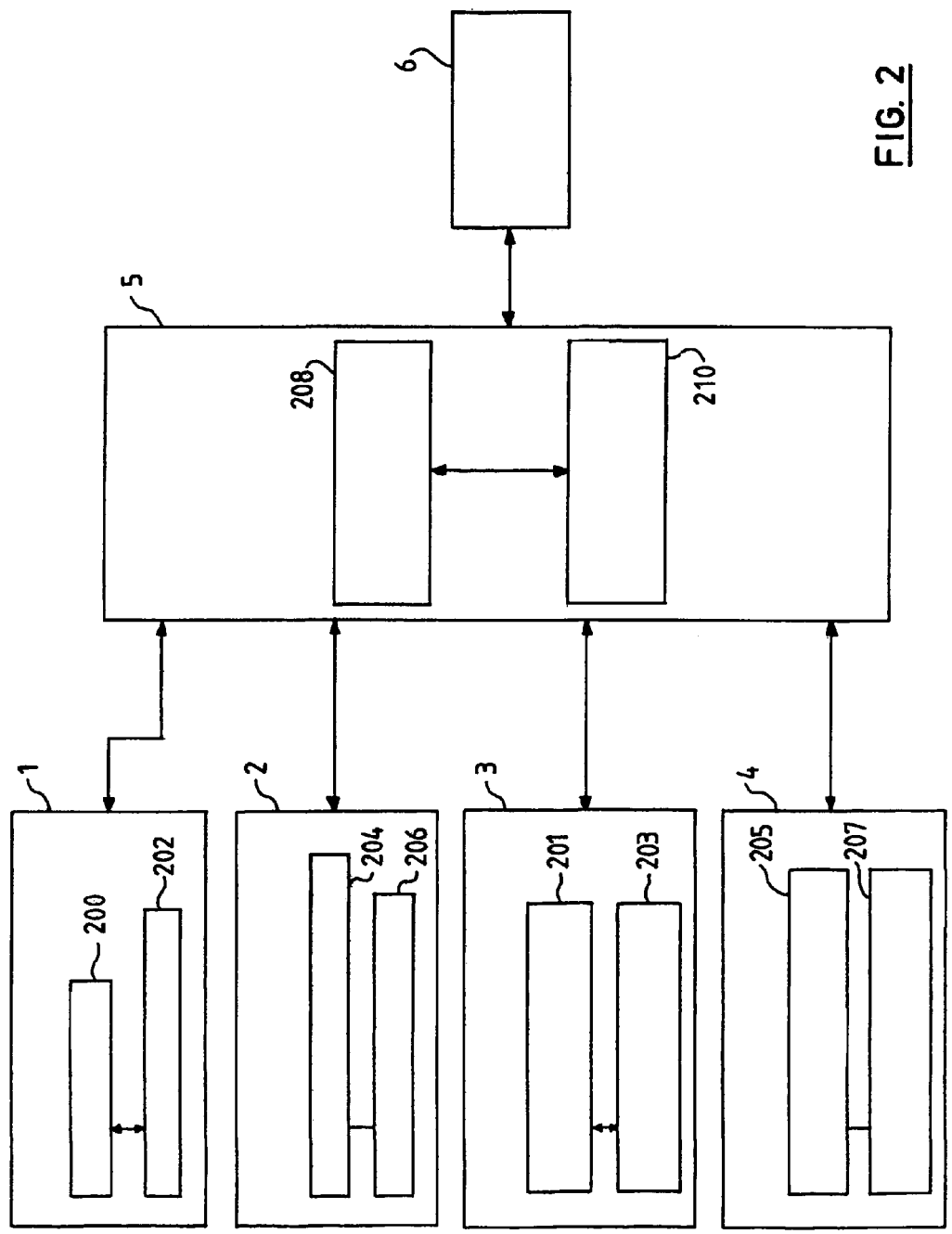
FIG. 2 shows a block diagram of the service providing system according to the present invention.

FIG. 2 shows a basic structural block diagram of the information providing system of the present invention. As shown in FIG. 2, the information providing system includes a user management portion 1, a device management portion 2, a static environment information management portion 3, a dynamic environment information management portion 4, an associating portion 5 and a virtual device management portion 6; wherein the user management portion 1, the device management portion 2 and the associating portion 5 constitute a sentient network generating device. Preferably, the static environment information management portion 3 and the dynamic environment information management portion 4 may also constitute the sentient network generating device.

Below there will be the descriptions of the construction of the above-mentioned portions.

In the user management portion 1, a user manager 200 accepts the registering or the change of the user, builds a user object or updates the information of the user object for the user in the real world, and stores the user object in the user object storage 202 or modifies the user object information stored in the user object storage 202.

In the device management portion 2, the physical device manager 204 accepts the registering or change of the devices, builds a device object or updates the information of the device object for the device in the real world, and stores the device object in the device object storage 206 or modifies the device object information stored in the device object storage 206.

In the information providing system according to the present invention, the physical entities in the real world are divided into the users and the devices, wherein the users are the objects to accept the services, while the devices are the medium for providing services to the users. The service providing system of the present invention builds a user object for each user and builds a device object for each physical device.

A user object can be, for example, defined to have the following data items:

```
A user object
----the basic information
    ----the personal device (PD)
    ----the physiological characteristics (PC)
        ----the social connections (SC)
    .......
----the authorization information
----the favorite information
    .......
```

Each user object includes the information related to the user, such as the basic information, the authorization information and the favorite information of the user and so on.

The basic information includes: the identification information of the personal devices (PD) owned by the user; the physiological characteristics (PC) information of the user; the social connections (SC) information of the user and so on.

The personal device is a term used to describe a certain device such as a badge, a credit card, a mobile phone, a PDA etc. owned by a user in the real world. In the personal device data items there are stored the identification information of the above devices, such as the personnel's badge number, the credit card number, the mobile phone number, the PDA net card number etc. The examples are not limited in the above-mentioned, so long as the identification information can be used to identify uniquely the personal device.

The physiological characteristics of a user are, for example, the fingerprint, the sound spectrogram, the iris image, the face features and so on of the user.

The social connections of a user include the information about the user himself/herself, the family members, the colleagues, the friend names of the user etc.

In the authorization information there are stored the user's usage privilege and usage class of the resources of a certain environment. For example, in a company the personnel are authorized to access all the available resources owned by the company, while the visitors are refused to access the available resources of the company. In the user object, the authorization information is selectable.

In the favorite information there are stored the user's requirements to accepting the services or using the device, such as preferring using what kind of physical devices to accept the audio information; refusing to use what kind of physical devices to accept the services, the requirements to a certain service and so on.

In the above information, the basic information is usually static information while the authorization information and the favorite information usually are dynamic ones.

A device object is defined to have, for example, the following data items:

```
Device object
    ----the basic configuration
    ----the status
    ----the access interface
    .......
```

Every device object includes the information related with the device, such as the basic configuration information, the status information, the access interface information etc. It should be emphasized that device objects are also built for those physical devices not owned by a user such as the video camera, the printer and the facsimile etc. installed in the local network of a building, because these devices can still be used by the user as a common device. The present invention will build a device object for each physical device.

The basic configuration includes the information related to the basic configuration of the device, such as the identification number, the type, the model number, the display capability, the processing ability and the functionalities etc. The basic configuration information generally relates to static information, i.e., usually they will not change after being logged on into the system.

The status information includes the usage status of the device, such as the information about whether the device is on-line, whether the information is available, the status information are usually dynamic information and may change with the change of the usage of the device or the movement of the device. Thus the status information of the device may be: off-line; on-line.

Access interface information includes the description about the access methods such as its communication protocols etc.

Figure 3:
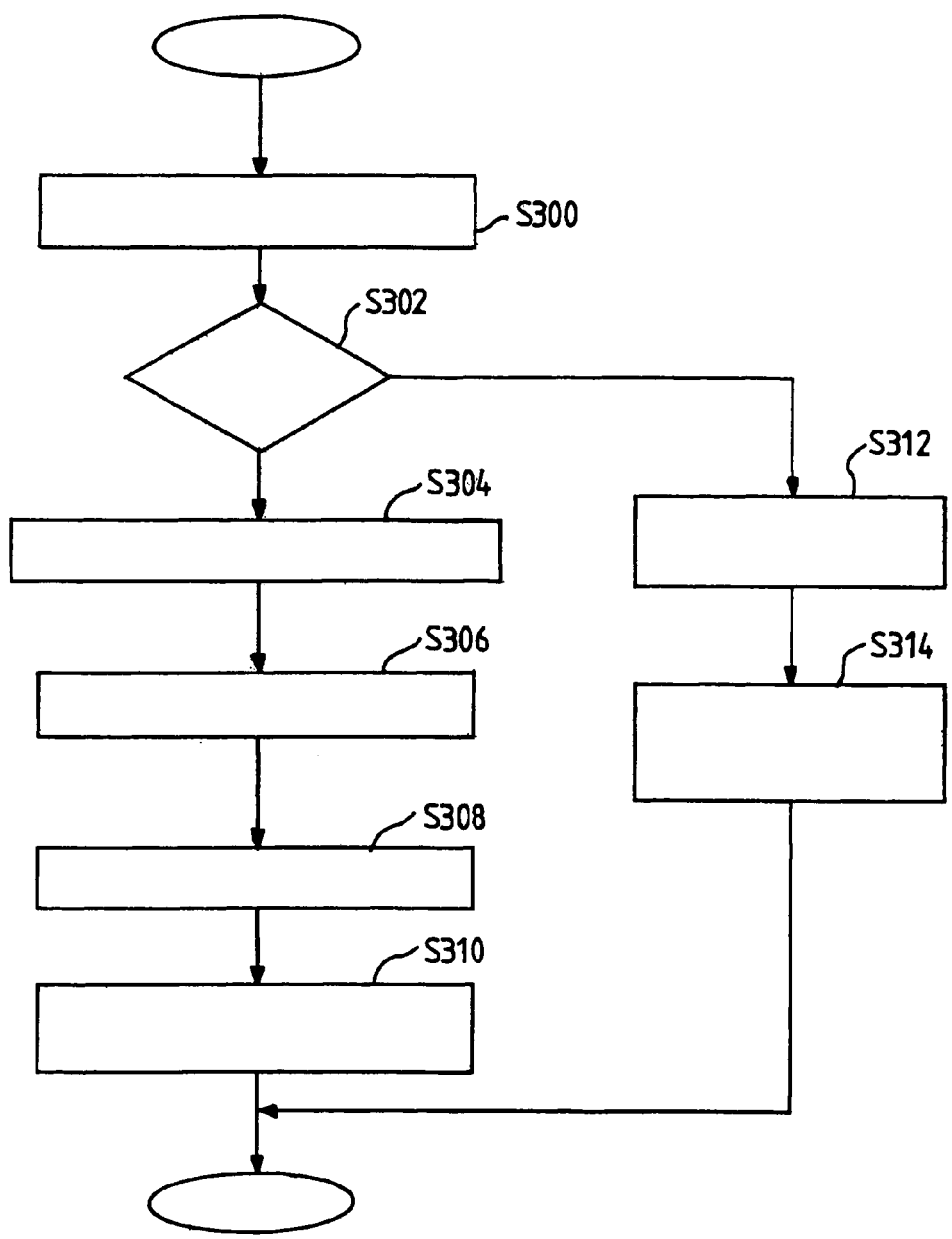
FIG. 3 shows a flow diagram of the management of the user information.

Next we will describe the user information management process according to the present invention with reference to FIG. 3.

The users can register in many forms, for example, they may register manually or automatically or in a combined form by combining these two forms. When registering manually, the user sends his/her own information to the user manager 200 via the existing communication network. Moreover, in order to collect the user information as comprehensively as possible, the user manager 200 according to the present invention may provide a registering display to the user to prompt the user to fill in the necessary information. Of course, in the manual registering form, the system manager of the user's local network may provide the user information to the user manager 200.

In the automatic registering form, the user manager 200 may download the user-related information from one or more network on which the user works. When a user enters a temporary environment, usually there will be an automatic registering, where the environment may automatically detects the existence of the user and obtains the user-related information via the user's personal device so as to register automatically for the user in such changing environment. The user-related information may be stored in user's personal device or a network link. Later an agent device used for helping the present invention to effect an automatic registering of the user information will be described.

A user needs to register only once, any changed information will be again sent to the user manager 200 only when there is any change of the above-described user object information, or the user manager 200 may collect actively the new user information from one or more user's network periodically or randomly.

Based on the accepted registering information of the user, the user manager 200 extracts the information needed for describing the data items of the user object and the information related to his/her personal device (PD), the information related to his/her physiological characteristics (PC); the information related to his/her social connections (SC); the authorization information and the favorite information and so on, and constructs a user object for the user based on these information.

Below the operating process of the user manager 200 will be described with reference to FIG. 3.

In step S300 of FIG. 3, the user manager 200 receives the user-related information.

In step S302 it is judged whether the user sending the information is a registered user. When it is determined that the user is an unregistered user, the process proceeds to step S304.

In step S304 the user manager 200 extracts the information needed for describing the user object from the accepted information.

In step S306 the user manager 200 builds a user object for the user based on the extracted information.

In step S308 the user manager 200 stores the built user object in the user object storage 202.

In step S310 the user manager 200 notifies the associating device 208 of the message that a new user has registered and lets the latter to do the further processing. The operation of the associating device 208 will be described later.

When in step S302, it is determined that the user is a registered user, the process proceeds to step S312, where the user manager 200 updates the corresponding user object data item information stored in the user object storage 202 based on the accepted information.

In step S314 the user manager 200 notifies the associating device 208 of the message that the user information has been updated and lets the latter to do the further processing. The operation of the associating device 208 will be described later.

There may be two situations when the device is registered. For the static devices such as printers and home telephones whose positions are rather fixed, when the devices are newly put into use, i.e. when they are connected to the network, the system manager of the network where the device is located registers the device information to the physical device manager 204, or the physical device manager 204 downloads the information of the device from the network where the device is located. For the dynamic devices such as the user PDA, the mobile phones, the notebook computer and so on, when the devices are put into use, e.g. when they are connected to the network, the server of the network where the device is located registers the device to the physical device manager 204. Those skilled in the art can recognize that when the dynamic devices are bought, the system manager or the server of the network where the device is located may also register the device information to the physical device manager 204. Later an agent device used to help the present invention to do the automatic registering will be described.

The physical device manager 202 extracts the basic device information, the status information, the access interface information needed for describing the device object from the accepted registration information of the device, and constructs a device object for the device based on the extracted information.

Next the operating process of the physical device manager 204 will be described with reference to FIG. 4.

Figure 4:
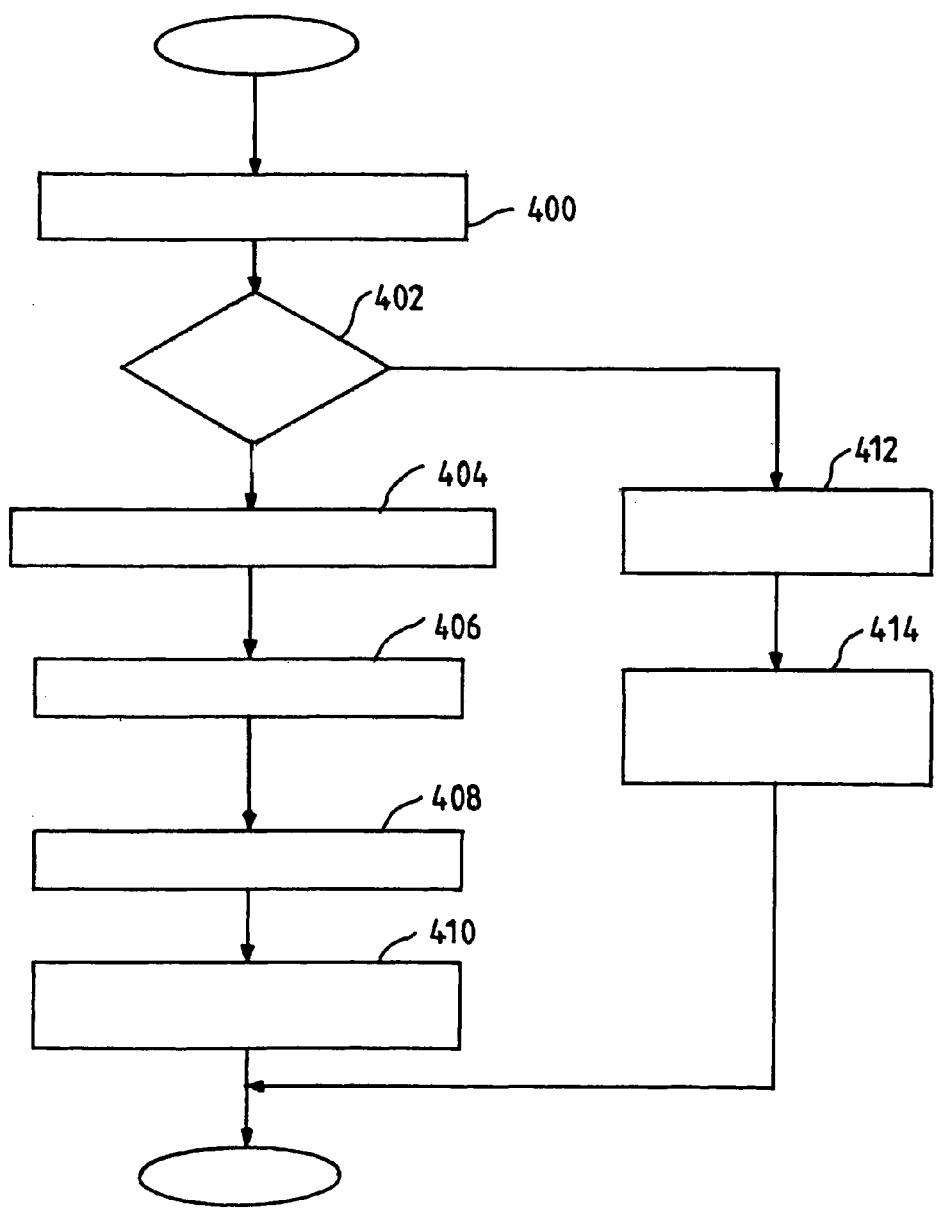
FIG. 4 shows a flow diagram of the management of the device information.

In step S400 of FIG. 4, the physical device manager 204 receives the device-related information.

In step S402 it is judged whether the device sending the information is a registered device. When it is determined that the device is an unregistered device, the process proceeds to step S404.

In step S404 the physical device manager 204 extracts the information needed for describing the device object from the accepted information.

In step S406 the physical device manager 204 builds a device object for the device based on the extracted information.

In step S408 the physical device manager 204 stores the newly built device object in the device object storage 206.

In step S410 the physical device manager 204 notifies the associating device 208 of the message that a new device has been registered and lets the latter do the further processing. The operation of the associating device 208 will be described later.

In step S402, when it is determined that the device is a registered device, the process proceeds to step S412, where the physical device manager 204 updates the corresponding device object information stored in the device object storage 206 based on the accepted information.

In step S414 the physical device manager 204 notifies the associating device 208 of the message that the device information has been updated and lets the latter do the further processing. The operation of the associating device 208 will be described later.

As the information used to describe the device object includes the dynamic information to be updated at any time, such as the status information, thus even if the device has been registered, once it is monitored that the above dynamic information of the device has changed, the physical device manager 204 is notified of the above-mentioned change, and the physical device manager 204 modifies the object information of the registered physical object so as to keep abreast of the newest device status.

For example, a dedicated monitoring device is used to monitor the status signals of the physical device, and notifies the physical device manager 204 of the change of the status of the physical device to let it update the status information when there is a change of the status. The monitoring device may be for example a server of the network where the physical device is located.

Next an agent device of the present invention will be described. The agent device may be detachably attached to various physical devices in the form of accessories, used to broadcast the basic information such as the functionalities, status and access methods of these physical devices or receive the information broadcast by other physical devices via the agent device.

Figure 5:
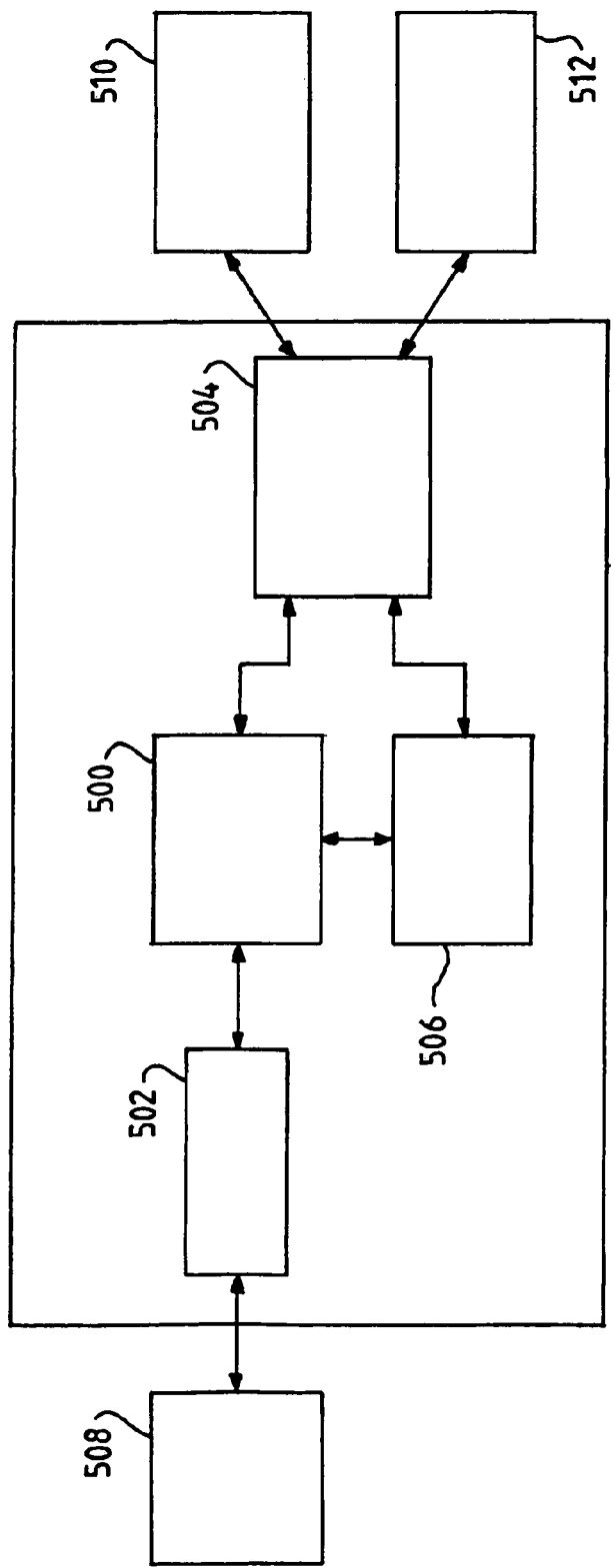
FIG. 5 shows a block diagram of an agent device.

FIG. 5 shows a block diagram of the agent device.

As shown in FIG. 5, an agent device includes a processing unit 500, an interface 502, a transceiving unit 504 and a storage unit 506.

Wherein the processing unit 500 is in charge of the overall control of the agent device, and, when needed, interacts with the main device 508 via a standard interface 502, obtains the information related to the device from the main device 508, such as the basic configuration information, the status information, the access interface information and so on of the device. Preferably, when the main device 508 is a personal device of a certain user, it further obtains the information related to the user from the main device 508.

The basic configuration of the device includes the information related to the basic configuration of the device, such as the identification number, the type, the model number, the display capability, the processing ability and the functionalities etc.

The status information includes the usage status of the main device, such as the information about whether the device is on-line.

The access interface information includes the description about the access methods such as its communication protocols etc.

Therefore, the information obtained by the processing unit 500 includes both the static information such as the basic configuration information and the access interface information of the main device, and the dynamic information such as the status information of the main device.

The standard interface 502 may adopt any known hardware and/or software or their combination, which can be used to exchange information and communicate with the main device. For example, the standard interface 502 may be a RS-232 interface, a parallel interface or a radio interface such as a radio interface using the bluetooth or infrared technology. But the standard interface 502 is not compulsory. It is also possible to input preliminarily the information related to the main device 508 to the agent device to store it via an input device not shown in the figures.

The processing unit 500 may be a processor having the ability of arithmetic and logical operations of any known type. The CPUs with low processing capabilities can be used to decrease the cost.

The storage unit 506 stores either temporarily or permanently the information of the main device 508 obtained by the processing unit 500. For example, the storage unit 506 may store permanently the obtained static information while store temporarily the obtained dynamic information.

The transceiving unit 504 broadcasts the information of the main device 508 obtained by the processing unit 500. The transceiving unit may broadcast the static information only once depending on whether the main device has registered to the system, while broadcasts the changed dynamic information any time it is changed. But it should be noted that the parameters used to identify the main device such as the type and identification number are the information needed to be broadcast so as to identify the devices. Of course, the parameters used to identify the main device are not limited to the above-mentioned, there are also other parameters used to identify the main device.

Moreover, the transceiving unit 504 further has the receiving capability used to receive the information of other main devices broadcast by the other agent devices and to further process the received information. The processing operation will be described later.

The information broadcast by the transceiving unit 504 is received by the device information collecting device 510 or other agent device 512 having the same broadcasting functionality. Later these two forms of device information collecting processes will be described in details.

Preferably, the transceiving unit 504 may be any known radio sensor, such as the radio sensors using the bluetooth or infrared technology. The sensors using the same technology can be sentient of one another. For example, the radio sensors using bluetooth technology can be sentient of the information broadcast by other radio sensors using bluetooth technology in a certain distance, and vice versa. The agent devices having such radio sensor structure are especially useful for broadcasting the information of the main device or the user in the mobile environment so as to be captured by the system. In addition, an agent device can be added to a device with a fixed position to broadcast the information of the fixed device.

Preferably, the transceiving unit 504 may be a combination of any known radio sensors, such as a combination of the radio sensors using the bluetooth and the radio sensors using infrared technology. Thus an agent device can be used to compatibly collect or broadcast the information using different technology so as to widen the functionality of an agent device.

Preferably, the agent device according to the present invention may also have a power supply system so that when the main device is shut down, the agent device still can work so as to broadcast the information of the main device to outside or to be sentient of the other devices on behalf of the main device connected thereto.

Besides, the agent device of the present invention may exist in the form of a recording label being sentient of by the other devices, the agent device may be for example a bar code label that records the information of a device or a user to which the agent device is attached. The information will be collected by other collecting devices.

In the present invention, the agent devices may be attached to any main device to help the system in collecting the main device information. The present invention provides the following forms to collect the device information via the agent devices.

Figure 6:
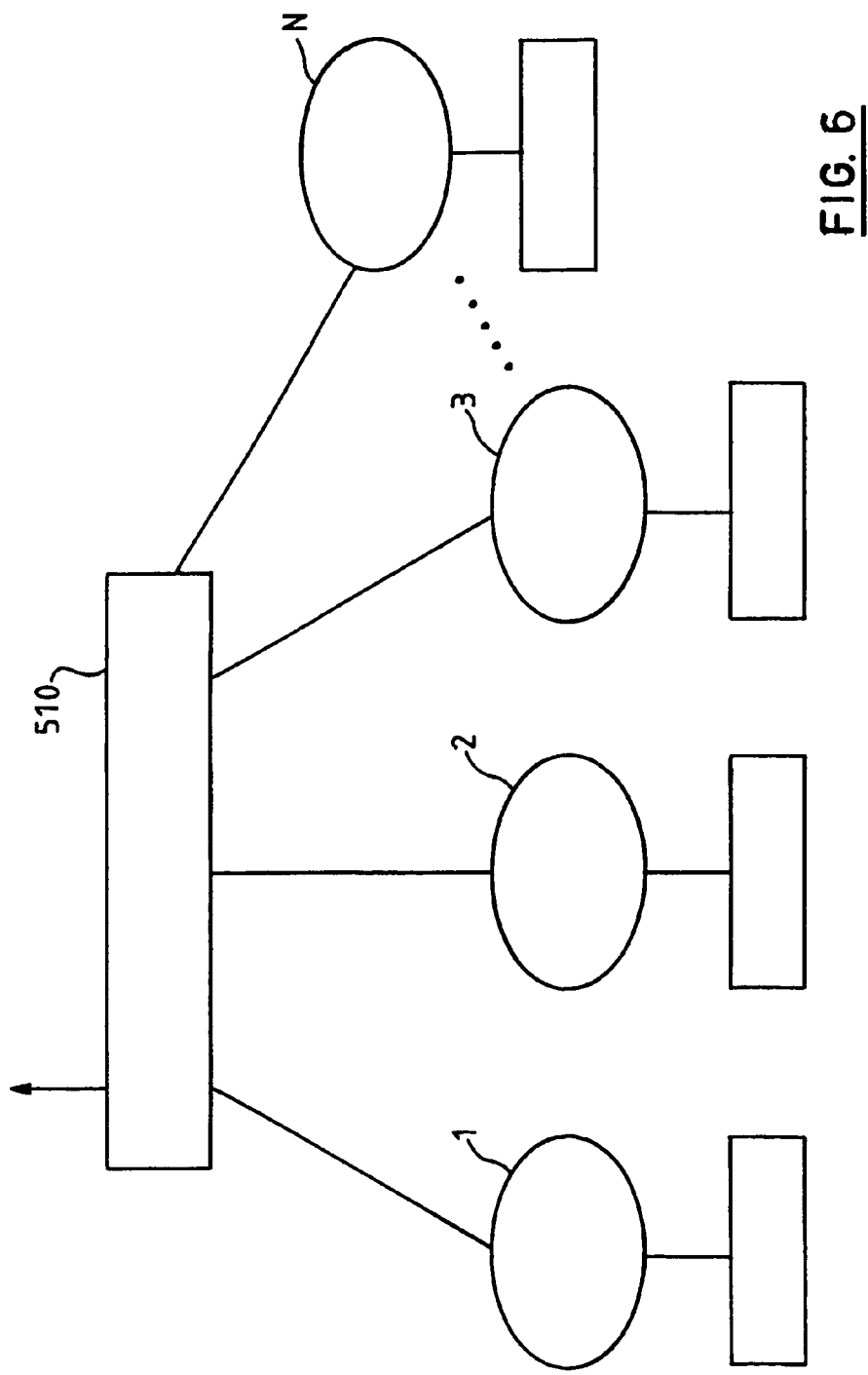
FIG. 6 shows a schematic diagram of how the agent device collects the device information in the centralized collecting form.

FIG. 6 shows a schematic diagram of how the agent device collects the device information in the centralized collecting form.

In this form, each of the device 1 to the device N has one agent device as shown in FIG. 5 attached thereto. The device information collecting device 510 collects the broadcast information broadcast by the agent devices located in its radio sensing scope. In such a way, the device information collecting device 510 and device 1 through device N constitute a sensor network to collect the device information.

Moreover, in the centralized collecting form, the functionality of the device information collecting device 510 may be included in the physical device manager 204.

Figure 7:
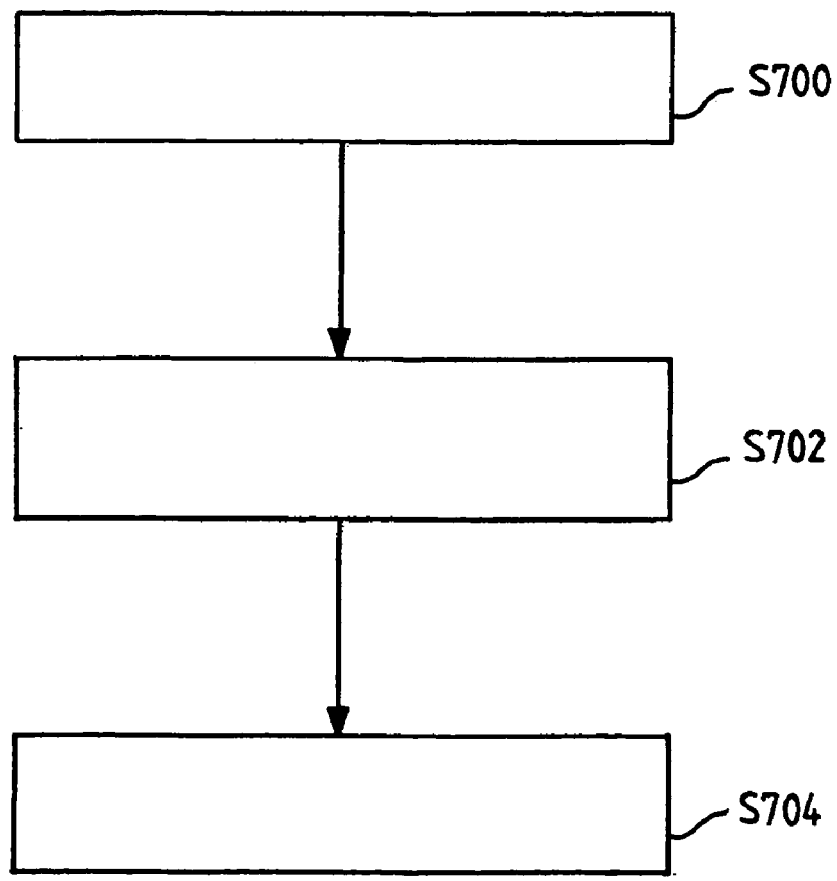
FIG. 7 shows a flow diagram of collecting the device information in the centralized collecting form.

FIG. 7 shows a flow diagram of collecting the device information in the centralized collecting form.

Below take device 1 as an example for describing the process of collection of device information.

Firstly, in step S700, when device 1 enters the information collection scope of the device information collecting device 510, the device information collecting device 510 collects the information of device 1 broadcast by device 1 itself through its own agent device 100.

In step S702, the device information collecting device 510 sends the collected information of the device to the physical device manager 204.

In step S704, the physical device manager 204 builds or modifies the device object according to the process shown in FIG. 4.

Figure 8:
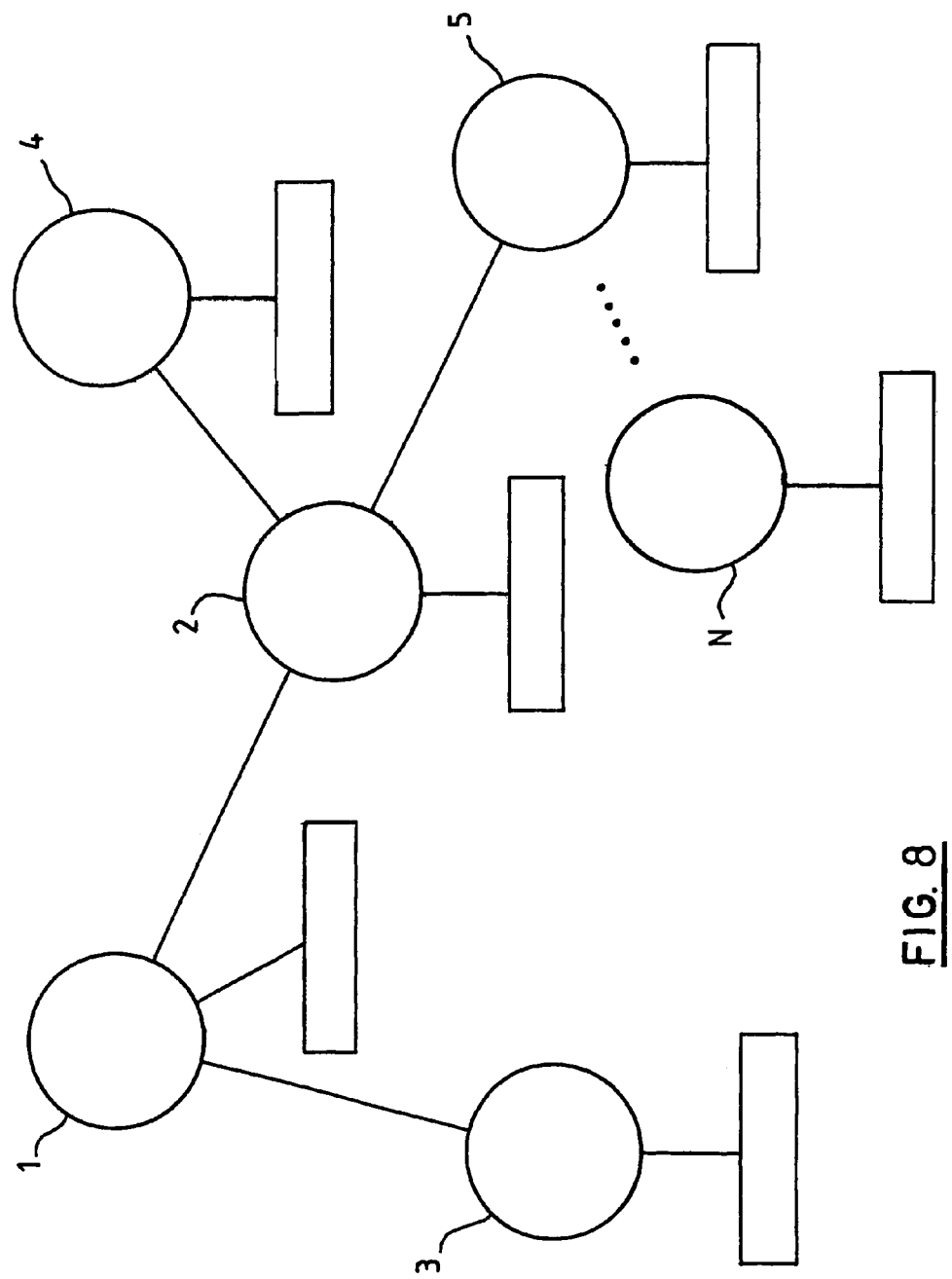
FIG. 8 shows a schematic diagram of collecting the device information by using the agent device in the ad hoc collecting form.

FIG. 8 shows a schematic diagram of collecting the device information by using the agent device in the ad hoc collecting form.

In this form, an agent device of a concrete physical device collects the information of other physical devices located in its sentient scope instead of the device information collecting device 510 used to collect the information of the physical devices. The collection of the device information is performed by transferring the device information between the agent devices. This form is especially suitable for information collection and processing in a relatively enclosed mobile environment, which is constituted by, for example, the mobile devices carried by the personnel of a company.

There are one or more agent devices capable of notifying the physical device manager 204 of its collection of the information in this form. In the example shown in FIG. 8, it is assumed that the agent device of device 1 has the above-mentioned functionality of notification.

Figure 9:
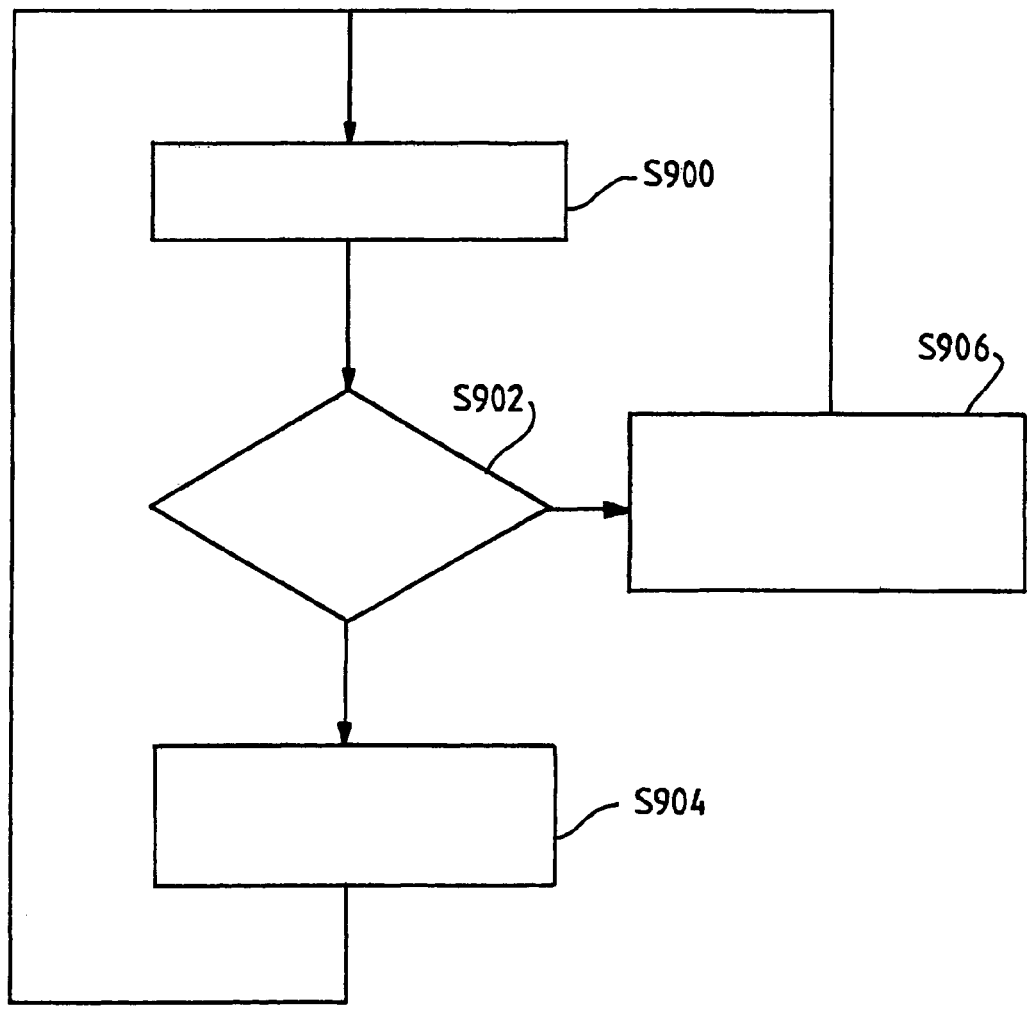
FIG. 9 shows a flow diagram of collecting the device information in the ad hoc collecting form.

FIG. 9 shows a flow diagram of collecting the device information in the ad hoc collecting form.

Firstly, in step S900, an agent device of a device receives the information broadcast by other agent devices.

Then in step S902 the agent device judges whether it itself can communicate with the physical device manager 204. This judgment is done by sending a query to the physical device manager 204 and receiving the response therefrom, or by pre-storing the corresponding related access parameters of the physical device manager 204 in the storage unit of the agent device and querying the access parameters.

When it is judged that it is impossible to communicate with the physical device manager 204, in step S904 the agent device broadcasts the received broadcast information and/or its own identification information via the transceiving device so that the neighboring agent devices can receive the information.

When it is judged that it is possible to communicate with the physical device manager 204, in step S906 the agent device sends the received broadcast information and/or its own identification information to the physical device manager 204 via the transceiving device.

All the other agent devices perform the same operation.

In such a way, the device information of all the devices 1 through N are sent to the physical device manager 204 via the agent device of device 1. Then the physical device manager 204 performs the processing shown in FIG. 4. Thus devices 1 through N of FIG. 8 constitute a sensor network to collect the device information.

Those skilled in the art can recognize that the above two forms can be used separately or cooperatively to send the device information to the physical device manager 204 of the system. For example, in the cooperative operation, device 1 sends the device information of all the devices 1 through N to the device information collecting device 510 that can cover device 1, and then the device information collecting device 510 sends the device information of devices 1 through N and the received device information of other devices to the physical device manager 204.

The above-mentioned two forms used by the agent devices of the physical devices to collect the device information can also be used in user information collection. When they are used for collecting the user information, the users may carry the agent device with himself/herself. In such cases, the basic user information or the changed user information are pre-stored in the agent device for later use in registering or modification operation.

Those skilled in the art can recognize that the user information can be stored in the agent device used as an accessory of the user's personal device so that the agent device can further broadcast the user information at the same time when it broadcasts the information of the personal device of the user. In addition, the user information can also be broadcast by the agent device attached to the personal device carried by the user via the personal device. Any form of using the agent devices of the present invention to broadcast or collect the user information or the device information is within the scope of the present invention.

Those skilled in the art can recognize that in addition to the above user information and device information collected by the user manager 200 and the physical device manager 204, there may be other information, so long as these information are needed for building the later-mentioned sentient network and virtual devices.

The process of collection of the user information and device information has been described in details. Sometimes the environment information is also very important for a user to search for the available and effective devices used by the user to accept the services. For example, when the user is working in a laboratory, it is realistic that the system knows various device information of the laboratory environment so as to provide the user more and better services. Another example is that when the user is in a mobile business environment, it is very useful to keep abreast of the device resources available to the user in various mobile environment, which is very helpful in providing the user the services more suiting this mobile environment.

Therefore, the present invention further provides the static environment information management portion 3 and the dynamic environment information management portion 4 for collecting the environment information, so that the system may collect the available devices for user based on the environment information.

As shown in FIG. 2, the static environment information management portion 3 includes a static environment information manager 201 and a static environment information storage 203.

The static environment information manager 201 obtains the position information and device identification information of various static devices such as the printers, the scanners, the computers not easily movable, the fixed telephones etc. from the existing information network such as the local network of the company. And these information are stored in the static environment information storage 203. Of course, the static environment information manager 201 can also collects static information in other ways, for example, via the sensor network constituted by the agent devices attached to the static devices provided by the present invention.

The structure of the static environment information data items are as follows:

---

Space scope
    ----sub-space scope 1
        ----the device A ID; the position of device A (optional);...
        ----the device B ID; the position of device B (optional);...
      ......
    ----sub-space scope 2
        ----the device C ID; the position of device C (optional);...
        ----the device D ID; the position of device D (optional);...
      ......
  ......

---

Wherein the space scope is for example a building where the company is situated; the sub-space is for example the rooms divided inside the company; device ID is the ID of the devices located in the sub-spaces.

The system can keep abreast of the space position status of the static devices in the system via the static environment information manager 201.

Figure 10:
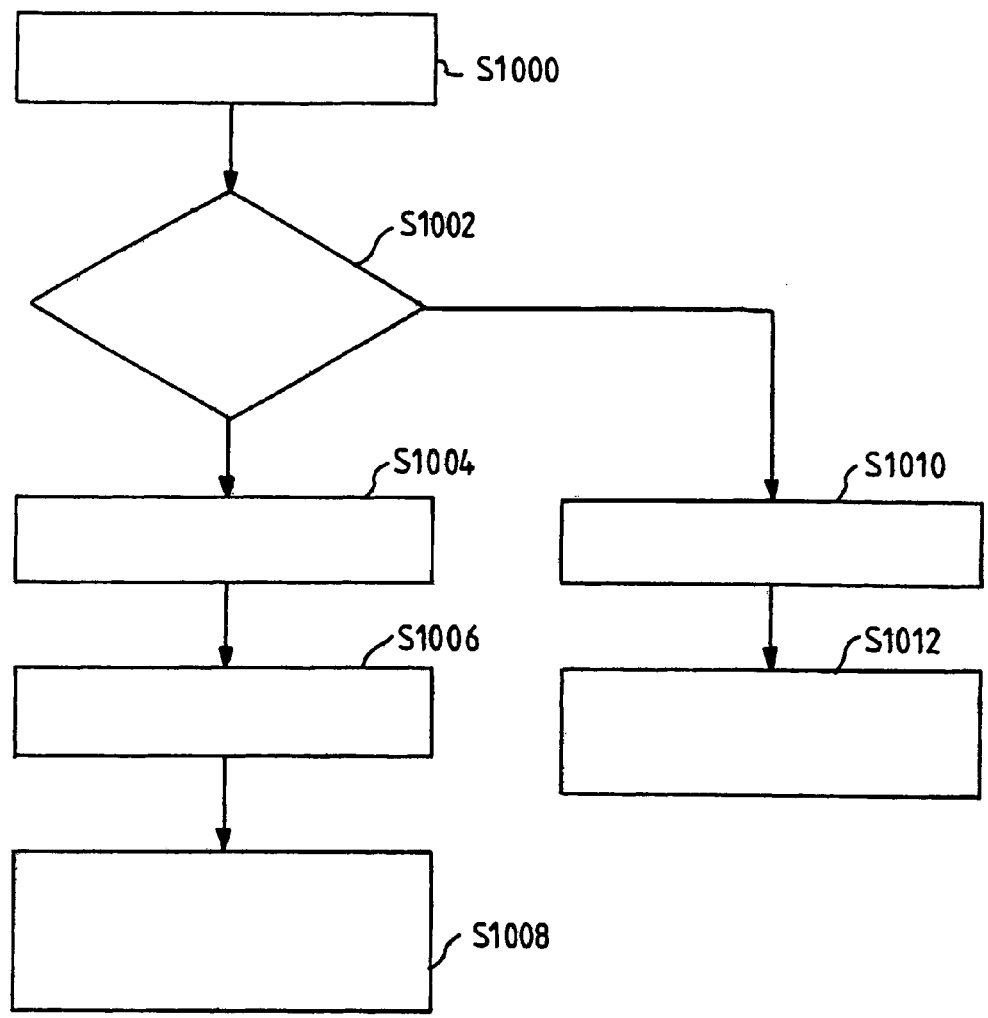
FIG. 10 shows a flow diagram of the process of collecting the static environment information.

FIG. 10 shows a flow diagram of the process of collecting the static environment information.

Firstly, in step S1000 the static environment information manager 201 receives the environment information related to the static devices from an external network such as the local network of the company, the telephone network and so on. Optionally, the agent devices of the present invention can be attached to these static devices so that the environment information related to the static devices can be sent to the static environment information manager 201 via the sensor network constituted by the agent devices.

In step S1002 it is judged whether the received environment information related to the static devices have been collected.

When it is determined that the received environment information related to the static devices have not been collected, in step S1004 some information are extracted from the received environment information related to the static devices so as to form the information needed for forming the static environment information.

In step S1006 the extracted static environment information are stored.

In step S1008 the message that new static environment information have been collected is sent to the associating device 208. The associating device 208 will do further processing.

When in step S1002 it is determined that the static device information have been collected, in step S1010 the static environment information are updated based on the received static device information.

In step S1012 the message that static environment information have been updated is sent to the associating device 208. The associating device 208 will do further processing.

Those skilled in the art can recognize that the above-mentioned operation can be started when a static device is newly connected or when the position of a static device has been changed.

As the mobile devices have become more and more popular, a plenty of dynamic environment information is included in addition to the above static environment information, these dynamic environment information include mobile device information and/or user information. The environment information usually is also dynamically changeable. When the devices or networks in the real world observe that the surrounding environment has changed, they will notify the system of the change so that the system can update the "observed" environment information. For example, a camera has the ability of visually observing the surrounding environment, thus the environment information captured by the camera will vary with the elapse of time. Moreover, for example, the fingerprint reader has the ability of sensing who touches it, thus the environment information captured by the fingerprint reader will change with the elapse of time and change of the users. Besides, another example of capturing the environment information is the known network capable of detecting the user position, for example, when a personnel enters a room by using his/her name card, the attendance checking system in the building can keep abreast of the current position of the personnel by obtaining the name card information of the personnel.

In the present invention, the devices or networks capable of sensing the environment changes are called dynamic environment information capturing network. The environment change generally refers to the changes sensed by the dynamic environment information capturing network when an on-line physical devices are moving or a user is entering or leaving a room. The dynamic environment information capturing network includes but is not limited to: the wireless network such as GSM, CDMA; the GPS positioning system; the bluetooth devices; the devices or systems having the hearing functionality; the devices or systems having the vision functionality; the devices or systems having the functionality of capturing the human physiological characteristics data; the sensor networks constituted by the agent devices and so on.

The present invention provides a dynamic environment information management portion 4 to effect the management of the dynamic environment information.

As shown in FIG. 2, the dynamic environment information management portion 4 includes a dynamic environment information capturing network manager 205 and a dynamic environment information storage 207.

The dynamic environment information capturing network manager 205 receives the changes of the environment sensed by the above-mentioned various dynamic environment information capturing network from the network, and stores these changes in the dynamic environment information storage 207.

In the present invention, as the dynamic environment information can be received from many dynamic environment information capturing network, thus preferably, in the dynamic environment information storage 207 one storage area is allocated for each dynamic environment information capturing network to store the dynamic environment information of that network. For the dynamic environment information capturing network capable of determining the position of the mobile devices or the users such as the wireless network, e.g. GSM, CDMA; the GPS positioning system; the attendance checking system installed inside the company, the structure of the dynamic environment information data items are for example the following:

---

Space scope
    ----sub-space scope 1
        ----the mobile device A ID; the position of mobile device A (optional);...
        ---- the mobile device B ID; the position of mobile device B (optional);...
      ......
      ----the user A ID; the position of user A (optional);...
      ......
    ----sub-space scope 2
        ----the mobile device C ID; the position of mobile device C (optional);...
        ----the mobile device D ID; the position of mobile device D (optional);...
      ......
      ----the mobile user B ID; the position of mobile user B (optional);...
      ......
......

---

Wherein the space scope is for example a building where the company is situated; the sub-space is for example the rooms divided inside the company; mobile device ID is the ID of the mobile devices moving in the sub-spaces.

For the dynamic environment information capturing network incapable of determining the position of the mobile devices or the users but capable of capturing the space relationship between the mobile devices or the space relationship between the users or the space relationship between the users and devices, such as the camera monitoring system installed inside the company and the sensor network constituted by the agent devices provided by the present invention, the structure of its dynamic environment information data items includes for example:

ID of the dynamic environment information capturing network
        the captured ID information of the mobile devices or user or other mapping information and so on For example, for the camera monitoring system, its dynamic information data items may include the camera ID and the user physiological characteristics data captured thereby.

Next the process of collecting the dynamic environment information by the sensor network constituted by the agent devices provided by the present invention will be described in details.

Below a flow diagram of the process of collecting the dynamic environment information in the centralized form of FIG. 6 will be explained with reference to FIG. 11 by taking device 1 as an example.

Firstly, in step S1100, when device 1 enters the information collection scope of the device information collecting device 510, the device information collecting device 510 collects the device information of device 1 broadcast by itself via its own agent device 100.

In step S1102 the device information collecting device 510 sends the collected device ID information to the dynamic environment information capturing network 205.

In step S1104 the dynamic environment information capturing network manager 205 stores the received device ID information of device 1 into the storage area in the dynamic environment information storage 207 allocated for the sensor network constituted by the device information collecting device 510 and devices 1-N.

In step S1106 the dynamic environment information capturing network manager 205 searches for the stored contents in other storage spaces and deletes the records having the ID of device 1. In such a way, it is guaranteed that the dynamic environment information management portion 4 can always keep the newest dynamic environment information.

In step S1108 the dynamic environment information capturing network manager 205 notifies the associating device 5 of the change of the dynamic environment information. The associating device 5 will do processing later.

In such a way, the system can keep abreast of the situation of the mobile devices sensed by the device information collecting device 510 for later use in the association operations.

Next a flow diagram of the process of collecting the dynamic environment information in the ad hoc form of FIG. 8 will be described with reference to FIG. 12.

Firstly, in step S1200 the agent device of a device receives the information broadcast by the agent device of another device.

In step S1202 the agent device builds a mapping table by using the received ID information of another device and the ID of its own main device.

Then in step S1204 the agent device judges whether it itself can communicate with the dynamic environment information capturing network manager 205, i.e. whether it has the functionality of notification. The judgment is performed by, for example, sending a query to the dynamic environment information capturing network manager 205 and receiving a response therefrom, or by pre-storing the corresponding access parameters of the dynamic environment information capturing network manager 205 into the storage unit of the agent device.

When it is judged that the agent device can not communicate with the dynamic environment information capturing network manager 205, in step S1206 the agent device broadcasts the built mapping table and the ID of the main device to which it itself is attached, and the neighboring agent devices receive the broadcast content. The neighboring agent device also builds a mapping table which includes the mapping relationship between the ID of the neighboring agent devices and the ID of the device itself and the mapping relationship between the ID of the device itself and the ID of another agent devices. Those skilled in the art can recognize that the above mapping relationship may include multi-level mapping depending on the number of transfer of the mapping table.

When it is judged that the agent device can communicate with the dynamic environment information capturing network manager 205, in step S1208 the agent device sends the built mapping table information to the dynamic environment information capturing network manager 205 via the transceiving unit.

In step S1209 the dynamic environment information capturing network manager 205 judges whether the held dynamic environment information need to be updated based on the received mapping table information. When it is judged that the dynamic environment information needs not to be updated, the process terminates. Otherwise the process proceeds to step S1210.

In step S1210 the dynamic environment information capturing network manager 205 updates the mapping relationship in the storage space of the sensor network constituted by the devices 1-N based on the received mapping table information.

In step S1212 the dynamic environment information capturing network manager 205 searches for the storage contents in other storage spaces and deletes the records having the ID of the corresponding devices. In such a way, it is guaranteed that the dynamic environment information management portion 4 can always keep the newest dynamic environment information.

In step S1214 the dynamic environment information capturing network manager 205 notifies the associating device 5 of the change of the dynamic environment information. The associating device 5 will do processing later.

In such a way, the system can keep abreast of the mutual relationship between the mobile devices sensed by the device 1 for later use in the association operations.

Those skilled in the art can recognize that the above two forms can be used separately or cooperatively to notify the dynamic environment information capturing network manager 205 in the system of the mutual relationship information of the devices. For example, in the cooperative operation, device 1 sends the device relationship of all the devices 1 through N to the device information collecting device 510 that can cover device 1, and then the device information collecting device 510 sends the device relationship information of devices 1 through N and other dynamic environment information to the dynamic environment information capturing network manager 205.

Figure 11:
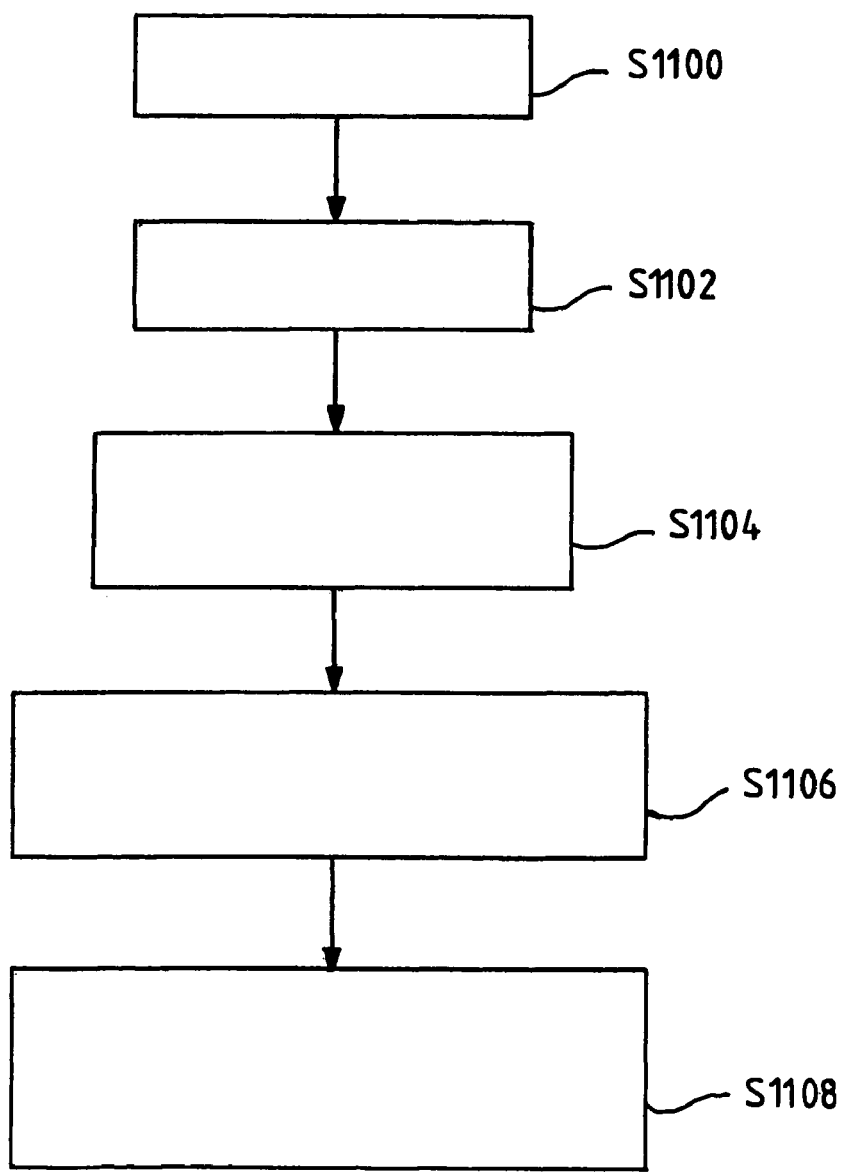
FIG. 11 shows a flow diagram of the process of collecting the dynamic environment information.
Figure 12:
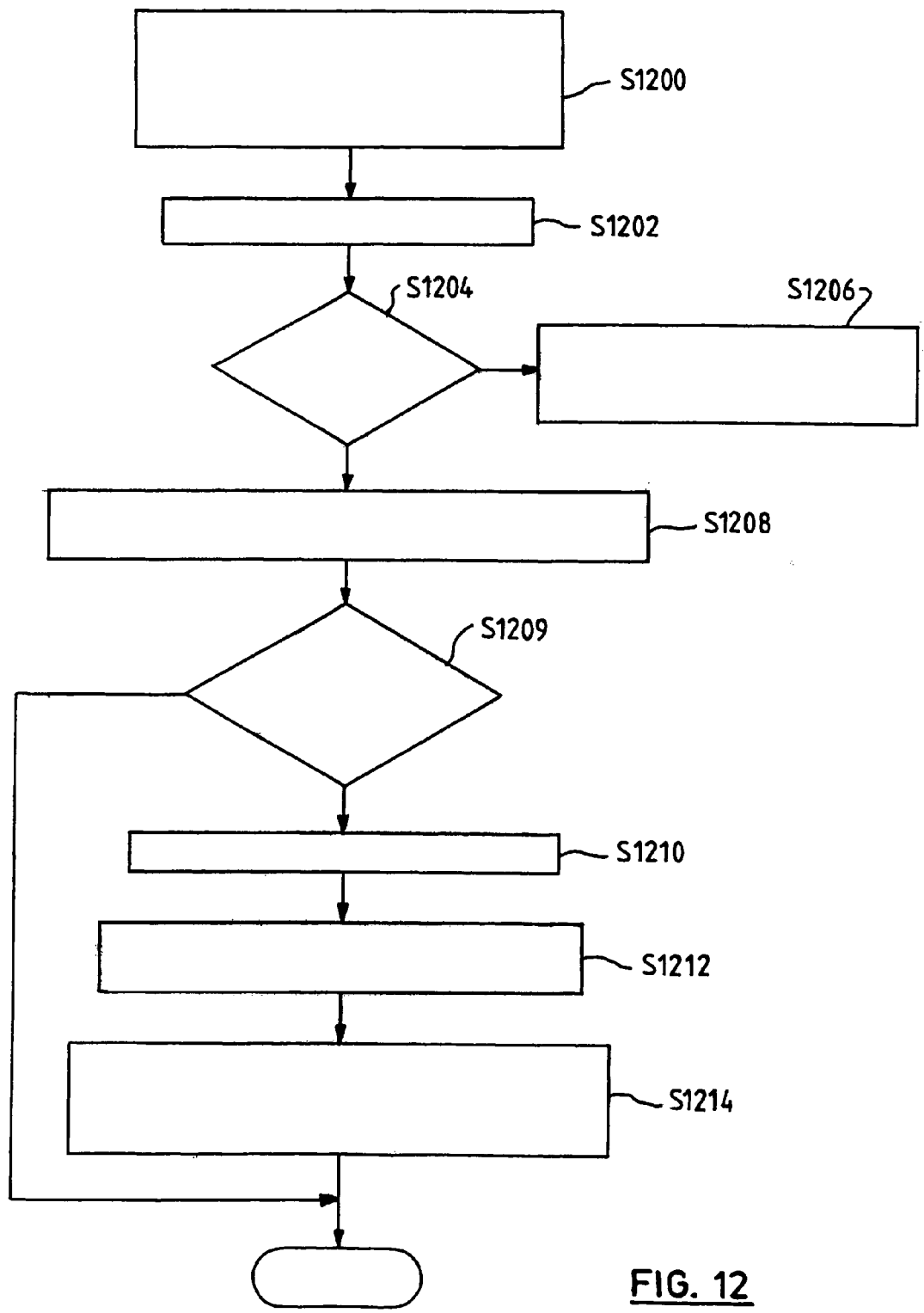
FIG. 12 shows another flow diagram of the process of collecting the dynamic environment information.

Those skilled in the art can recognize that the operations of the above FIG. 11 and FIG. 12 can also be used to collect the mutual mapping relationship between the users and further between the mobile users and the mobile devices under mobile environment.

Those skilled in the art can also recognize that the operations of the above FIG. 11 and FIG. 12 can also be used to collect the mutual mapping relationship between the devices and the users under static environment so as to collect the relationship between various devices and/or users under static and dynamic environments. By using the environment information capturing network constituted by the agent devices to capture the environment information, a quick and convenient way is provided for collecting the device information and user information as much as possible.

Figure 13:
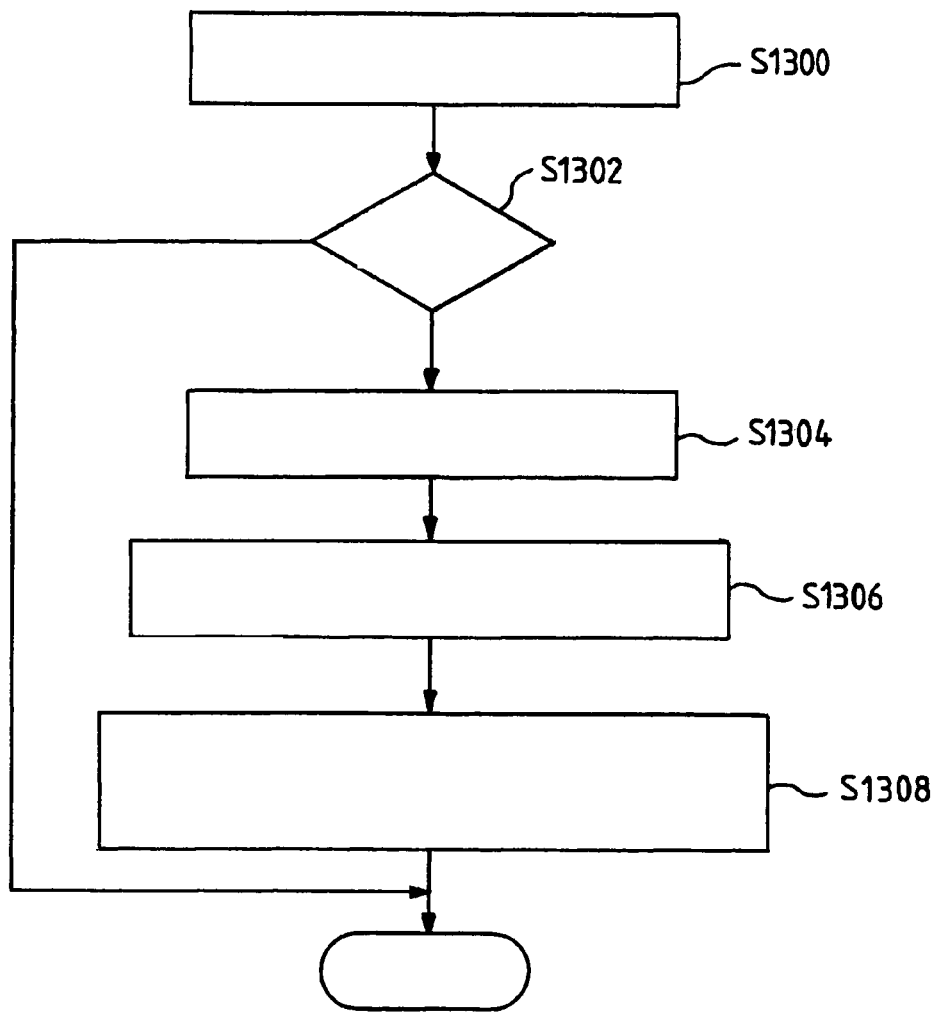
FIG. 13 shows a further flow diagram of the process of collecting the dynamic environment information.

The process of sending the dynamic environment information to the dynamic environment information capturing network manager 205 by other dynamic environment information capturing networks is similar to the process described in the above FIG. 11. The difference is that instead of using the device information collecting device 510, a server of the dynamic environment information capturing network (in the case of that the network is a separate sensing device, the sensing device itself can be regarded as a server) sends the captured dynamic environment information to the dynamic environment information capturing network manager 205. The dynamic environment information also varies with different dynamic environment information capturing network, such as the physiological characteristics of the users. The process is shown in FIG. 13.

In step S1300 the dynamic environment information capturing network manager 205 receives the dynamic environment information captured by a dynamic environment information capturing network from this network.

In step S1302 the dynamic environment information capturing network manager 205 judges whether the dynamic environment information stored in the dynamic environment information storage 207 needs to be updated. When it is determined that the dynamic environment information does not need to be updated, the process terminates. Otherwise the process proceeds to step S1304.

In step S1304 the dynamic environment information capturing network manager 205 updates the information in the corresponding storage spaces based on the received dynamic environment information.

In step S1306 the dynamic environment information capturing network manager 205 searches for the storage content in other storage spaces and deletes the user object information and the device object information related to the dynamic environment information. In such a way, it is guaranteed that the dynamic environment information management portion 4 can always keep the newest dynamic environment information.

In step S1308 the dynamic environment information capturing network manager 205 notifies the associating device 5 of the change of the dynamic environment information. The associating device 5 will do processing later.

From the description below it will be understood that the static environment information and dynamic environment information collected by the present invention have a function of bridge for building the mutual relationship of the users and more available devices in the real world.

The process of collecting and processing the environment information has been described. Next the operation of associating a user object with one or more available device objects will be described.

The associating device 208 in FIG. 2 associates a user object stored in the user object storage 202 with one or more device objects stored in the device object storage 206. If needed, the association operation will be carried out based on the environment information provided by the static environment information management portion 3 and the dynamic environment information management portion 4.

Below three forms of building the association relationship according to the present invention will be described in details.

The first form is to build up an association relationship between the user object and the device objects via the personal device (PD).

As mentioned above, the information of the personal devices owned by a user is stored in the personal device data items of the user objects in the user object storage 202. And the device object information is stored in the device object storage 206.

Thus the associating device 208 matches the types and the identification numbers of the personal devices in the personal device data items of the user objects with the types and the identification numbers in the basic information data items of the device objects so as to find the device objects having the same information as the user object so that an association relationship is built up between the user object and the device objects.

For example, a user A in the real world has a personal device: i.e. a mobile phone X having the bluetooth functionality. As in the virtual world both the user object A1 built for user A and the mobile phone object X1 built for the mobile phone X include the type and the phone number of the mobile phone X, thus the associating device 208 can associate the user object A1 with the mobile phone object X1 by recognizing that the user object A1 and the mobile phone object X1 have the same type and phone number of the mobile phone.

Though the above association operation is performed by utilizing the type and the identification number of the personal device, but the association operation can be performed by utilizing other information in the basic information data items of the personal device which can be used to identify the personal device, so long as the user and the personal device can be associated by matching.

In order to reduce the association work load, the associating device 208 may perform the filtering operation prior to the association operation, some devices are filtered out based on a certain conditions so that during the association operation it is no longer necessary to associate these devices. For example, the device objects, which are "off-line" in the status information table, can be filtered out, because these devices do not have the ability to work for time being. Of course, the filtering step is not compulsory.

According to the above association form, the associating device 208 of the present invention may associate a user object with the corresponding device objects by means of personal device identification information.

Figure 14:
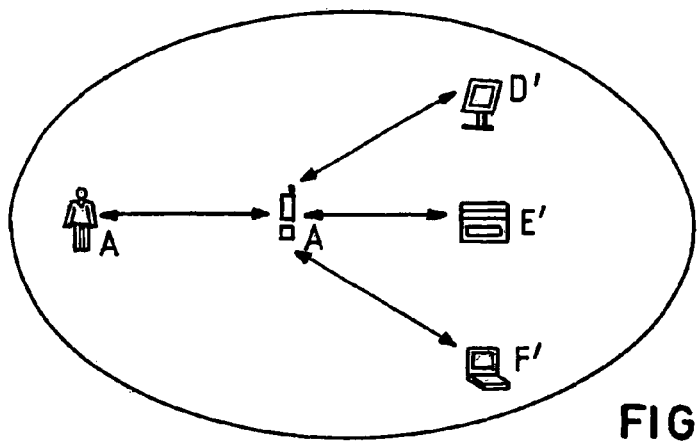
FIG. 14 shows a schematic diagram of building an association between a user object and a device object by means of a specialized device data item.

In FIG. 14, the user object A and the mobile phone device object A' belonging to the user are associated with each other by the first form.

The second form is to utilize the physiological characteristics data to build an association relationship between the user object and the device objects.

As stated previously, when a user is registering, the user manager 200 puts its physiological characteristics information into the physiological characteristics data item of its user object.

Many dynamic environment information capturing networks can also capture and sense the physiological characteristics information of the user. For example, a capturing network constituted by the video cameras can capture the user face image, a capturing network constituted by the sound capturing devices can capture the user sound characteristics. And as stated previously, all the dynamic environment information captured by the capturing network are stored in the dynamic environment information storage 207.

Thus the associating device 208 matches the physiological characteristics data in the physiological characteristics data items of the user object with the dynamic environment information stored in the dynamic environment information storage 207 so as to find one or more device objects (or capturing network) having one or more identical physiological characteristics data as the user object so that an association relationship is built up between the user object and the corresponding device object.

Figure 15:
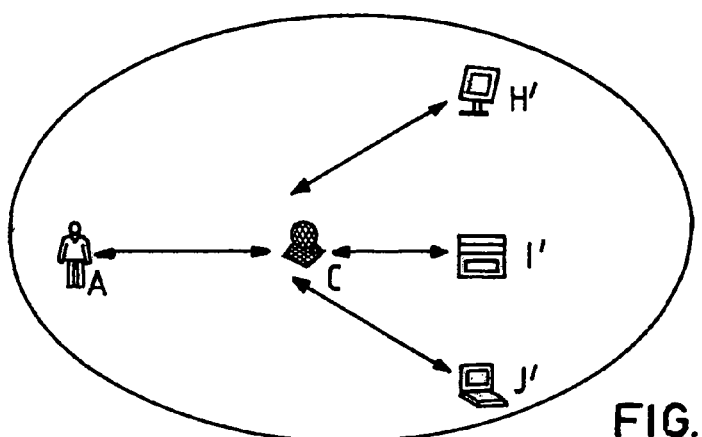
FIG. 15 shows a schematic diagram of building an association between a user object and a device object by means of the environment information.

For example, in FIG. 15, the user object A and the video camera device object C' are associated with each other by the second form.

On the basis of the above two association forms, the user object A can be associated with more device objects by utilizing the static environment information or the dynamic environment information.

For example, in FIG. 14, after the associating device 208 has built an association relationship between the user object A and the mobile phone device object A', the associating device 208 can further build the association relationship between the user object and more device objects on the basis of the collected static/dynamic environment information by using the mobile phone device object A' as a bridge. For example, an information provided by the GSM network that the mobile phone device object A' is located in a meeting room of the company is stored in the dynamic environment information storage 207; while another information that in the meeting room there is further a printer resources is stored in the static environment information storage 203, then the associating device 208 builds up an association between the user object A and the printer resource based on these information.

The right side of FIG. 14 shows an example of building more association for the user object by using the environment information. The associating device 208 builds the association between the user object A and the device D', the device E' and the device F' captured by the capturing network in which the agent device of the mobile phone is located on the basis of the dynamic environment information collected by the capturing network of the agent devices containing the mobile phone device object A' by using the mobile phone device object A' of the user as a bridge.

The right side of FIG. 15 shows an example of building more association for the user object by using the environment information. The associating device 208 builds the association between the user object A and the device H', the device I' and the device J' captured by the capturing network in which the agent device of the video camera device object C' is located on the basis of the dynamic environment information collected by the capturing network in which the agent device of the video camera device object C' is located by using the video camera device object C' as a bridge.

The third form is to build up an association relationship between the user object and the device objects via the social connections.

As mentioned above, when a user is registering, if possible, the user manager 200 puts its social connections information into the social connections data items of its user object.

Figure 16:
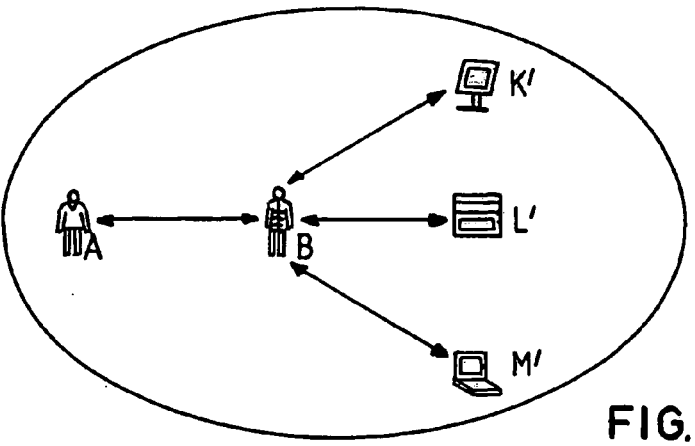
FIG. 16 shows a schematic diagram of building an association between a user object and a device object by means of a social connections data item.

FIG. 16 shows a schematic diagram of building an association between a user object and a device object by means of a social connections data item.

For example, providing the associating device 208 has built some association relationship between user B and some device objects such as device objects K', L' and M'. If user A and user B have some social connections, then the associating device 208 builds up a relationship between user A and user B by means of the information in the social connections data items of user A object, and further builds up an association relationship with those device objects K', L' and M' that have already built an association relationship with user B.

When the associating device 208 associates the user objects with the device objects, the three forms can be used separately or in any arbitrary combination. The present invention provides a flexible form for building the association relationship.

By means of the associating device 208, an association relationship is built up between a user object and one or more available device objects.

It should be noted that the association relationship built up for the user object with one or more available device objects by the associating device 208 may vary as well. For example, when a new device object is built, the associating device 208 associates the new device object with the corresponding user object. When the static/dynamic environment information changes, the associating device 208 will rebuild or modify the corresponding association relationship of the user object based on the changed environment information. Any influence that will affect the association relationship between the use object and the device object may initiate the rebuilding or modification operation of the association relationship of the corresponding user object by the associating device 208. Thus, the associating device 208 can always keep the newest association relationship between the user object and the device object.

The associating device 208 takes each user object and one or more device objects associated with the user object as a sentient network entity, and stores them in the sentient network storage 210.

Figure 17A:
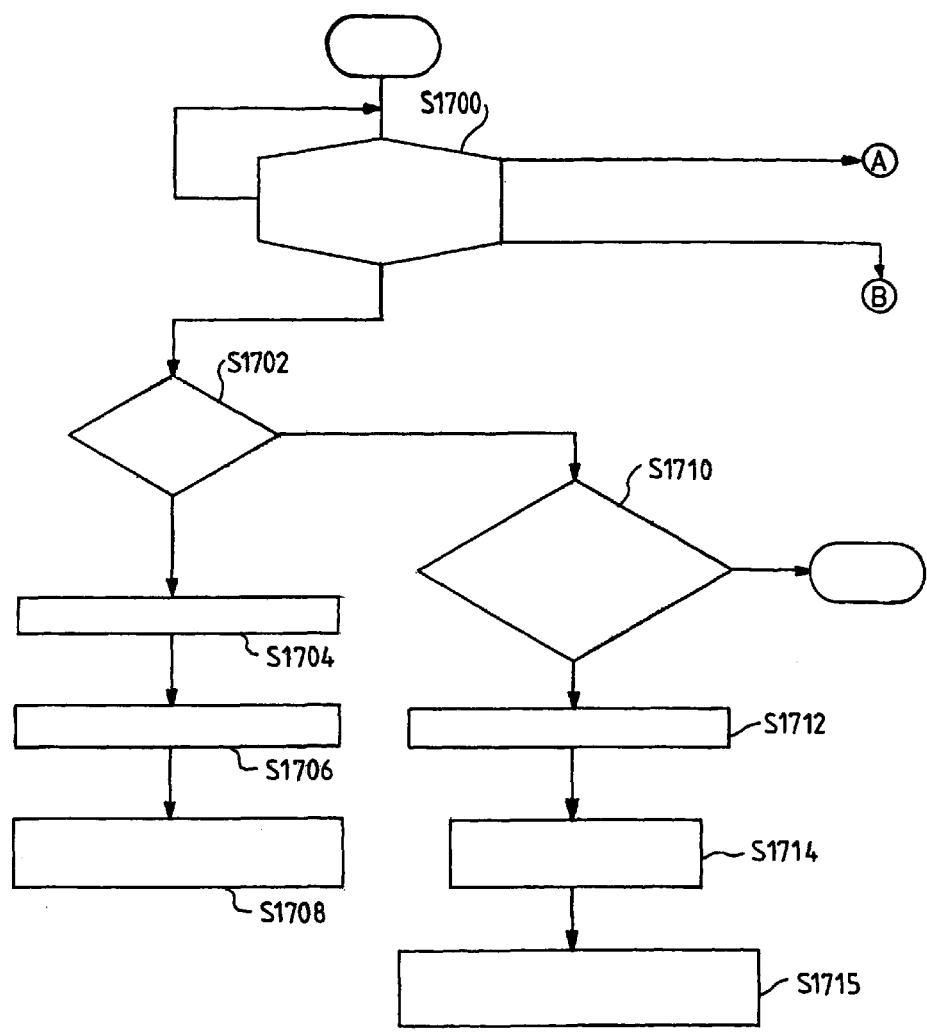
FIGS. 17a-17c show a flow diagram of associating operation.
Figure 17B:
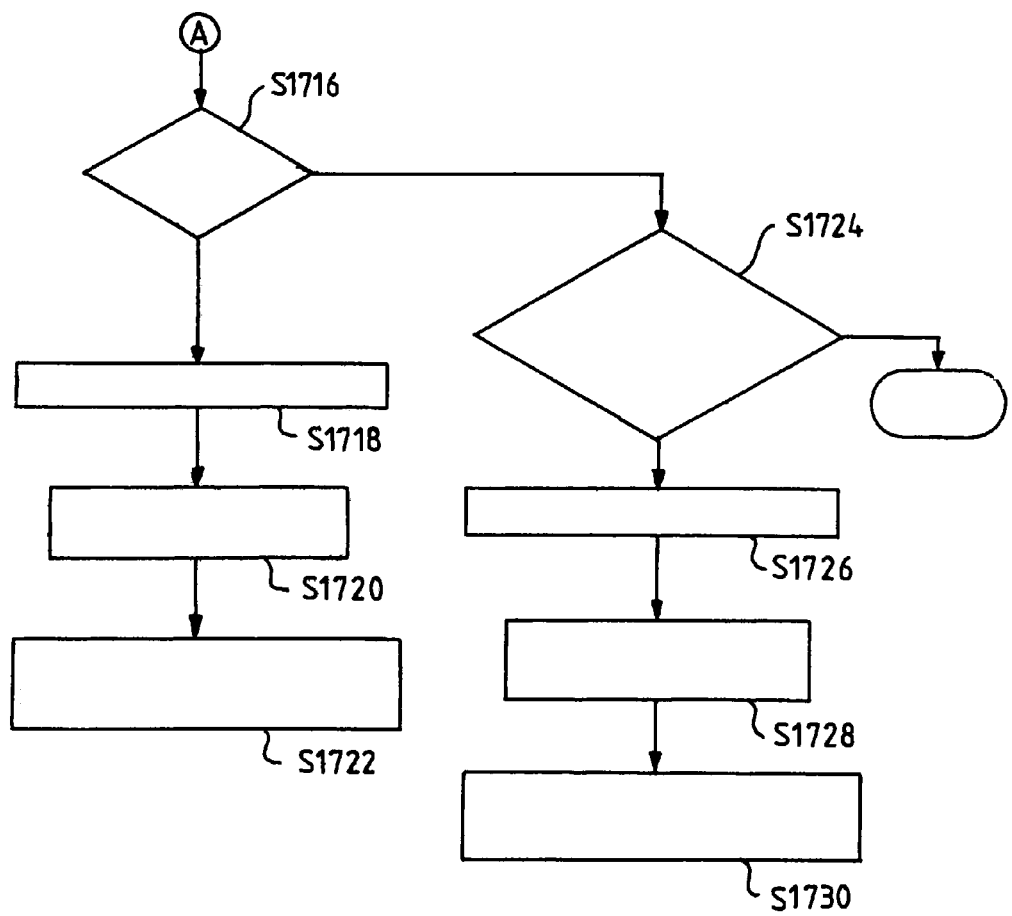
Figure 17C:
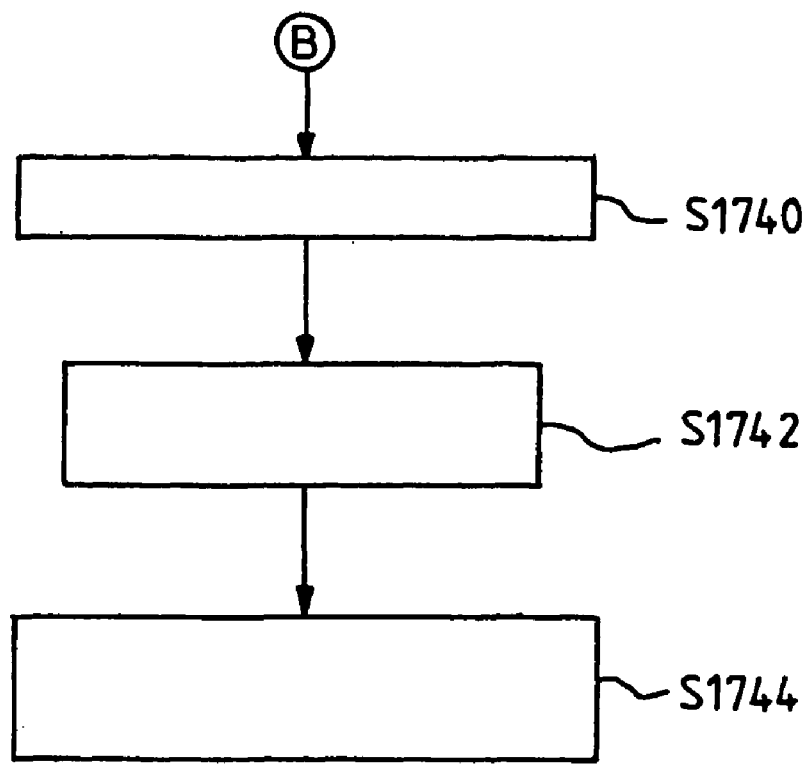

FIGS. 17A-17C show a process of the associating operation of an associating device.

In step S1700 the associating device 208 monitors to judge whether a registration or a modification notice has been received from the user manager 200 or the physical device manager 204 and whether an environment information modification notice has been received from the static/dynamic environment information manager 201 and 205.

When it is determined that no notice has been received, the associating device 208 continues monitoring.

When it is determined that a notice has been received from the user manager 200, the process proceeds to step S1702 to judge whether the notice is a registration notice or a modification notice. When it is determined that the notice is a registration notice, the process proceeds to step S1704, where the associating device 208 uses one of the above three forms or a combination of them to associate the newly registered user object. It should be noted that during the association operation, some of the device objects may be given up based on the favorite information stored in the user object such as the favorite information that the user refuses using some devices so that the device resources available to the user can be selected and tailored for the user. Furthermore, during the association operation, the device objects whose statuses are "off-line" may be given up based on the statuses information of the device objects. Besides, during the association operation, some device objects may be further given up based on the authorization information on the device objects such as the privileges for accessing the devices by the user. So the result is that the associated device objects are actually the device objects available to the user object.

In step S1706, the user object and the device objects associated for the user object are stored in the sentient network storage 210 as one sentient network entity.

Optionally, still in step S1708, the message that a new sentient network has been built is notified to the virtual device management portion 6 to let it do processing operation later.

When it is determined that the notice is a modification notice in step S1702, the process proceeds to step S1710, the associating device notifies the virtual device management portion 6 of the message that the user object information has changed. Then it is judged based on the modified content whether the existing association relationship needs to be updated. The judgment can be performed based on, for example, whether the favorite information and/or the authorization information have changed. When it is determined that it is necessary to update, the process proceeds to step S1712 to do association operation based on the change of the user object. Otherwise the processing operation terminates.

In step S1714 the corresponding sentient network stored in the sentient network storage 210 is updated by using the result of association.

Optionally, in step S1715 the message that the sentient network has been updated is notified to the virtual device management portion 6 and let it do the processing later.

When it is determined in step S1700 that a notice has been received from the physical device manager 204, the process proceeds to step S1716 to judge whether the notice is a registration notice or a notice about the change of the device information.

When the judgment result is a registration notice, the process proceeds to step S1718 to perform the association operation for the newly registered device. The associating device 208 uses one of the above three forms or a combination of them to associate the newly registered user object. It is to be noted that during the association operation, some of the device objects may be given up based on the user favorite information stored in the associated user object so that the device resources available to the user can be tailored for the user. Furthermore, during the association operation, the device objects whose status is "off-line" may be given up based on the status information of the device objects, so that the associated device objects are actually the device objects available to the user object.

After the newly registered device object is associated with the corresponding user object, in step S1720 the content of the corresponding sentient network stored in the sentient network storage 210 is updated by using the result of association.

Optionally, in step S1722 the message that the sentient network has been updated is notified to the virtual device management portion 6 and let it do the processing later.

When in step S1716 it is determined that the notice is a notice of the change of the device information, the process proceeds to step S1724 to notify the virtual device management portion 6 of the message that the sentient network has been updated. It is judged based on the content of the change whether the existing association relationship needs to be updated. Preferably, when the status of the device changes, e.g., from an on-line status to an off-line status, or from an off-line status to an on-line status, it is determined that it is necessary to update. When it is determined that it is necessary to update, the process proceeds to step S1726, and the association operation is performed based on the changed content of the device object. Otherwise the processing terminates.

In step S1728 the corresponding sentient network stored in the sentient network storage 210 is updated by using the result of association.

Optionally, in step S1730 the message that the sentient network has been changed is notified to the virtual device management portion 6 and let it do the processing later.

When in step S1700 it is determined that the notice is from the static/dynamic environment information manager 205 and 207, the process proceeds to step S1740, where the associating device 208 performs the association operation for one or more corresponding user objects based on the changed environment information.

In step S1742 one or more corresponding sentient networks stored in the sentient network storage 210 is updated by using the result of association.

Optionally, in step S1744 the message that one or more sentient networks have been updated is notified to the virtual device management portion 6 and let it do the processing later.

Those skilled in the art can recognize that the above operation of notifying the virtual device management portion 6 is not compulsory.

Searching for the available device object resources for a user object by means of the association operation and storing them as a sentient network entity can keep abreast of the information about the devices available to the user in the real world.

From the above description, by collecting the information of the devices, the users and the environment in the real world and searching for the available device resources for the user based on the collected information, the present invention provides a sentient network generating method and device, which provide a base for sharing the resources and making the devices working cooperatively.

When a user in the real world himself/herself requests to access a service, or when a service provider himself/herself requests to provide a service to a user, the virtual device management portion of the present invention builds a virtual device operating environment for the user. A virtual device serves as a service interface between the user and the service provider. The virtual device will make full use of the overall capabilities of all the physical devices currently available to the user so as to provide services for the user.

Therefore, when the service provider provides service information to the user, the user only has to interact with the virtual devices. The information sent to the service provider is transferred by the virtual device. The virtual device performs a coordinative management of the devices available to the user so as to provide services to the user according to the service requirements of the user and/or the device capabilities.

Previously the process for information collection and association processing of the present invention have been described, a sentient network has been built up for a user object in the virtual world, the sentient network includes the information of the user object and the device objects available to the user object. Thus, the sentient network can be regarded as an available device object material base. Later when the virtual device will be described, the sentient network will be used as an available device object material base for the virtual device. However, the available device objects material base for the virtual device can be obtained by other ways instead of using the sentient network of the present invention. For example, the available device object material base may be obtained by means of other available technology capable of providing the information of the physical devices currently available to the user. Thus, the available device object material base used by the virtual device of the present invention is not limited to the above-mentioned sentient network, which is only one example of the available device object material base usable by the virtual device.

Below the processing operation of the virtual device management portion 6 will be described in details.

The virtual device management portion 6 of the present invention generates a virtual device for each user object accepting the service. It provides adequate services for the user object based on the generated virtual device.

Figure 18:
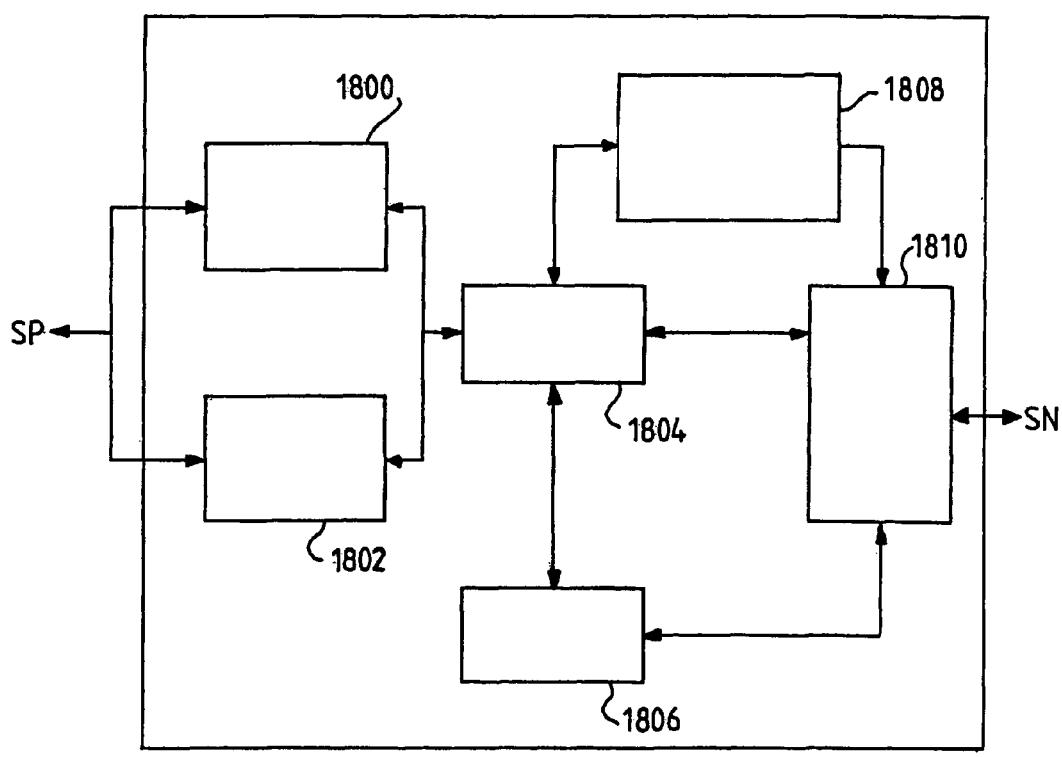
FIG. 18 is a structural diagram of the virtual device of the present invention.

As shown in FIG. 18, the virtual device includes a service processing portion 1800, a negotiating portion 1802, a controlling portion 1804, a monitoring portion 1806, a service information redistributing portion 1808 and an interface portion 1810.

The controlling portion 1804 is used for coordinating the control operations of other portions constituting the virtual device and transferring the information.

The interface portion 1810 is the interface used to interact with the sentient network generating portion, the information interaction between other portions of the virtual device and the components of the sentient network generating portion is carried out by the interface portion 1810. Besides, the user object interacts with the virtual device via the interface portion 1810.

The monitoring portion 1806 is in charge of interacting with the sentient network generating portion, monitoring the sentient network and keeping in breast of the real construction of the sentient network.

The negotiating portion 1802 is in charge of interacting with the service provider to select most suitable service type for the user based on the sentient network.

When the user accepts a concrete service, the service processing portion 1800 is in charge of the information interaction between the user and the service providers.

The service information redistributing portion 1808 determines the device object/combination of the device objects to accept the requirements for services based on the service types determined by the negotiating portion 1802, distributes the user object information sent by the service processing portion 1800 to the corresponding device object and is responsible for coordinating the operations among the device objects when a combination of them is used.

Next the operations of the above portions will be described in details.

Figure 19:
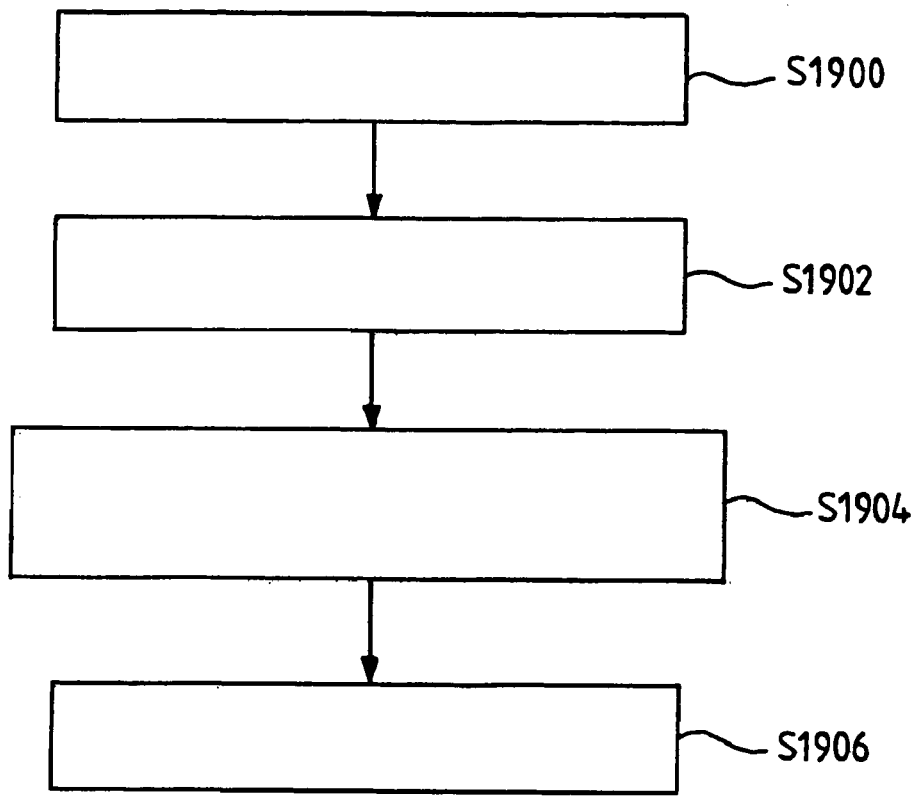
FIG. 19 depicts a processing flow diagram of an embodiment of the present invention, wherein the virtual device selects a service type for a user object.

At first a description is given with reference to FIG. 19, when a user object sends a service request via the device object in the sentient network, the virtual device selects the service types and the device objects/the combination of the device objects for the user object.

Firstly, in step S1900 the interface portion 1810 receives a service request sent by a user object from a device object in the sentient network and transfers the service request to the controlling portion 1804, the controlling portion 1804 transfers the service request to the negotiating portion 1802 and notifies the monitoring portion 1806 of the service request event.

In step S1902, in response to the receipt of the service request event, the monitoring portion 1806 obtains the available device object information and/or the user object information from the sentient network of the user object. Then the obtained device object information is sent to the negotiating portion 1802 via the controlling portion 1804.

In step S1904, in response to the receipt of the service request, the negotiating portion 1802 sends the service request to the corresponding service provider to ask the service provider to provide the service type information and the device object capabilities requirements information of the service types that can satisfy the service request. The service types are for example one or more levels of service categories provided by the service provider to satisfy the service request, the device object capabilities requirement information are for example the device object capabilities of the required service types.

In step S1906, in response to the service type information and the device object capabilities requirements information received from the service provider, the negotiating portion 1802 selects a service type suiting the capabilities of the available device object from the service types provided by the service provider based on device object information and/or user object information received from the negotiating portion 1806 and notifies the service provider of the selected service type, and sends the device object capabilities requirements information corresponding to the service type to the service information redistributing portion 1808 via the controlling portion 1804.

Optionally, in the above selection process there may be a reference made to the personal tailoring requirement of the user in determining the service type.

For example, in step S1906, the currently available device objects can be further filtered based on the user favorite information of the device to accept the services obtained from the user object preliminarily by the monitoring portion 1806 or obtained by querying the user, the favorite information may be for example what physical devices the user prefers to use in accepting the video services, what devices to use in accepting the audio services and so on. Then a service type suiting the capabilities of the filtered available device object is selected from the service types provided by the service provider.

Optionally, the negotiating portion 1802 may select preliminarily some service types suiting the capabilities of the available device object from the service types provided by the service provider, and then determines a service type by querying the user object, or further determines a service type with reference to, for example, the service requirements of the user in the favorite information of the user object.

Figure 20:
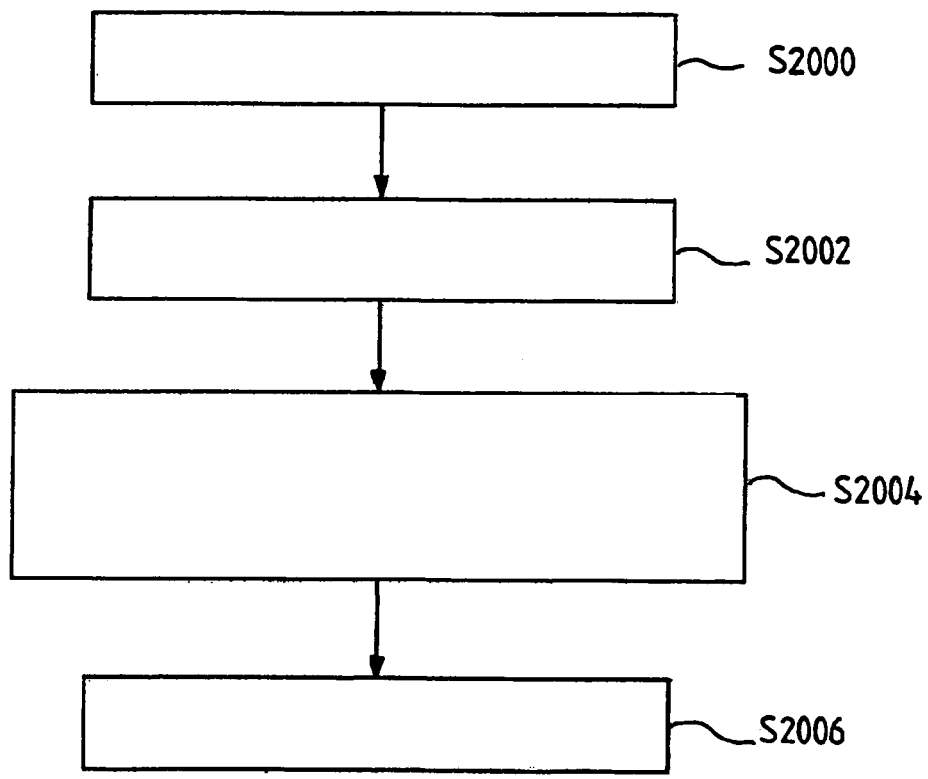
FIG. 20 depicts another processing flow diagram of an embodiment of the present invention, wherein the virtual device selects a service type for a user object.

FIG. 20 shows the process of a virtual device selecting a service type and a device object/a combination of the device objects for a user object when the user object sends a service request via the device object in the sentient network.

In this form, the operations of steps S2000 and S2002 are the same as those of steps S1900 and S1902 and thus can be omitted.

In step S2004, in response to the receipt of the service request, the negotiating portion 1802 sends the service request and the available device object information and/or the user object information received from the monitoring portion 1806 to the corresponding service provider to ask the service provider to provide the service type which can satisfy the service request based on available device object capabilities.

In step S2006, in response to the service type information received from the service provider, the negotiating portion 1802 selects a service type for the user and notifies the service provider of the selected service type, and sends the device object capabilities requirements information corresponding to the service type to the service information redistributing portion 1808 via the controlling portion 1804.

Optionally, in the above step S2004, the currently available device objects can be further filtered based on the user favorite information of the device to accept the services obtained from the user object preliminarily by the monitoring portion 1806 or obtained by querying the user, then the filtered device object information are provided to the service provider.

Optionally, in step S2006 the negotiating portion 1802 may provide a plurality of service types provided by the service provider to the user, and then determines a service type by querying the user object, or further determines a service type with reference to, for example, the service requirements of the user in the favorite information of the user object.

By means of the processing of the above negotiating portion 1802, a service type is determined for the user object to accept the service information.

Next the process for providing service of the determined service type for the user will be explained.

The negotiating portion 1802 further notifies the monitoring portion 1806 of the filtered device object identification information or the device object identification information that has been given up based on the user information via the controlling portion 1804.

Figure 21:
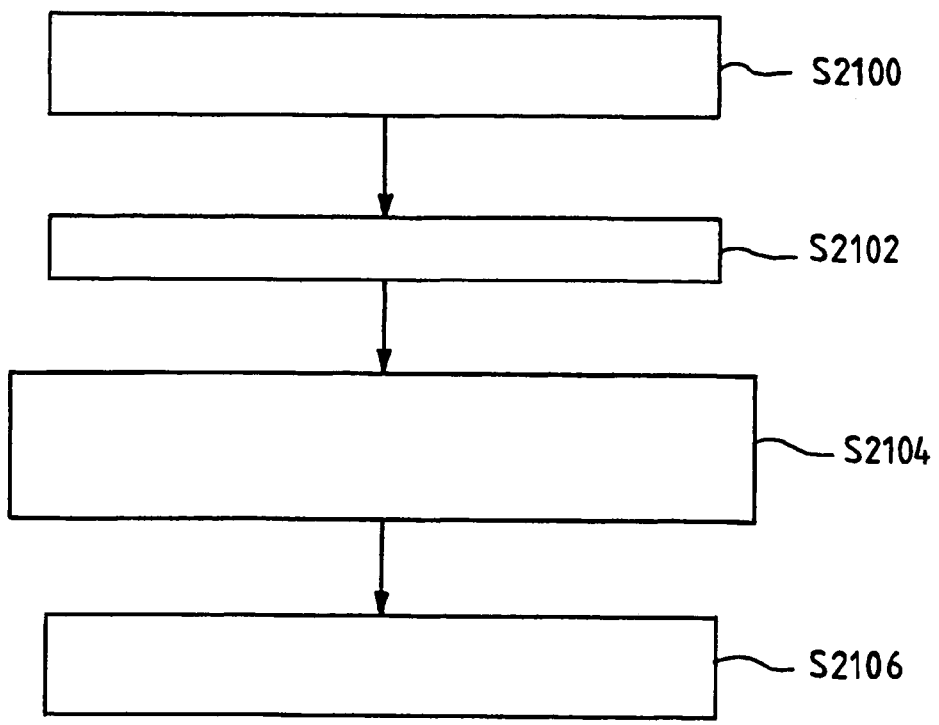
FIG. 21 depicts a procedural flow diagram of a user object accepting a service.

FIG. 21 shows a process flow diagram for providing a service to a user object.

Firstly, in step S2100 the service processing portion 1800 receives the provided service information of the selected service type from the service provider.

In step S2102 the service processing portion 1800 sends the received service information to the service information redistributing portion 1808 via the controlling portion 1804.

In step S2104 the service information redistributing portion 1808 obtains the available device object information from the monitoring portion 1806, and if needed, obtains the device object information given up during filtering of the device object and/or the favorite information of the user object referred to, and determines the device object/combination of the device objects to receive the service information based on the device object capabilities requirement information received from the negotiating portion 1802.

In step S2106 the service information redistributing portion 1808 distributes the service information to the determined device object/combination of the device objects via the controlling portion 1810. When necessary, a synchronization control operation is performed among the device objects, e.g. when the service information flow among the device objects needs to be synchronized.

In the process of the service provider providing services for the user objects, all the information are interchanged between the user objects and the service provider via the virtual device. The interaction information sent by the user object to the service provider is first sent to the controlling portion 1804 by the interface portion 1810. The controlling portion 1804 transfers the interaction information to the service processing portion 1800 for the service processing portion 1800 to transfer the information to the service provider.

Thus, according to the present invention, a virtual device operation environment is provided for the user objects to accept the services of the service provider.

Therefore, by interacting with the virtual device to provide the service information, the service provider does not have to consider the capabilities of the concrete devices for accepting the services so as to develop various user-oriented service types, which can satisfy different requirements of the users.

Furthermore, the virtual device according to the present invention can select suitable service types for the users based on the service types provided by the service provider in connection with the available device object capabilities. Thus the quality of the service accepted by the users is guaranteed and the device capabilities around the users are fully utilized.

In addition, the virtual device according to the present invention can determine the available device object to receive the service information or the available service types based on the personal tailoring requirements of the users so as to provide a user-centric service.

Moreover, as the virtual device according to the present invention can keep abreast of the device resources available to the users, thus it can provide an efficient way for providing in time the information services for the users.

In the process of providing service by the above-mentioned virtual device for the user objects, when the device object information or the user object information changes, e.g., when the number of the device objects has increased or decreased or when the favorite information of the user object has changed, the service quality of the service accepted by the user object may be affected. Thus, the virtual device of the present invention further has the ability of suitably adjusting the virtual device operation environment with the change of the sentient network.

Figure 22:
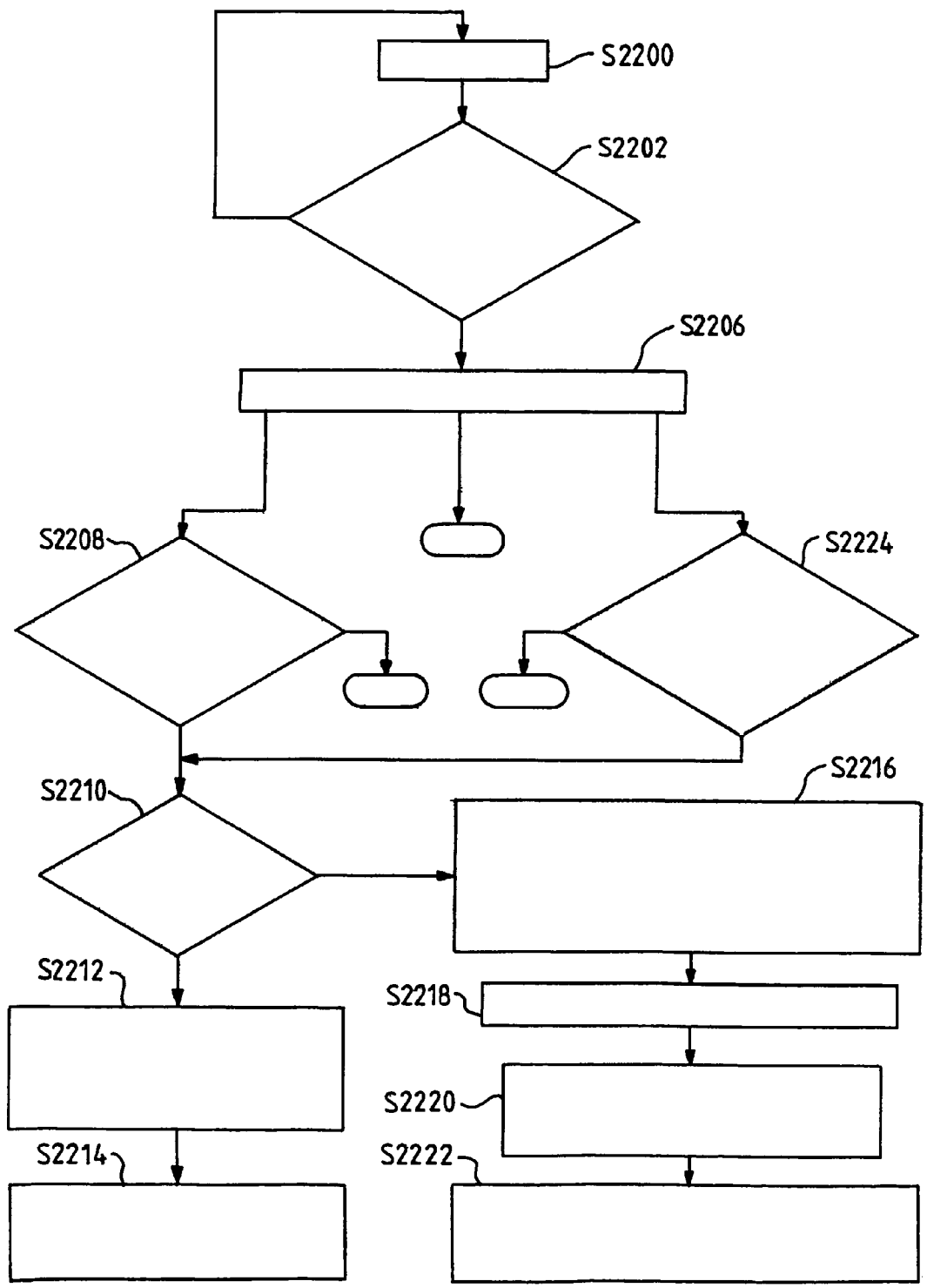
FIG. 22 depicts a flow diagram of the adjustment of the operating environment of a virtual device.

FIG. 22 shows the process of the adjustment of the virtual device operation environment carried out by the virtual device.

Firstly, in step S2200 the monitoring portion 1806 monitors the information of the sentient network via the interface portion.

In step S2202 the monitoring portion 1806 judges whether the information sentient network has changed. When it is monitored that the sentient network information has changed, the process proceeds to step S2206, otherwise the monitoring operation goes on.

In step S2206 the monitoring portion 1806 determines the type of the change.

When the type of the change is a decrease of the number of the device objects, the process proceeds to step S2208 to judge whether the removed device object has been used to receive the service information. When the result of judgment is negative, the processing terminates. Otherwise the process proceeds to step S2210 to notify the service information redistributing portion 1808 of the decrease of the number of the device objects, then the service information redistributing portion 1808 judges whether there is any replacing device object/combination of the device objects. When there is a replacing device object/combination of the device objects, the process proceeds to step S2212 to notify the service information redistributing portion 1808 to use the replacing device object/combination of the device objects to continue providing information service. In step S2214, in response to the receipt of the notice, the service information redistributing portion 1808 continues providing information service to the replacing device object/combination of the device objects.

When in step S2210 it is judged that there is no replacing device object/combination of the device objects, the process proceeds to step S2216, where the service information redistributing portion 1808 asks the negotiating portion 1802 to determine again the service type and notify the controlling portion 1804 to keep the current service progress information and temporarily stop providing services to the user objects.

In step S2218 the negotiating portion 1802 sends the current service progress information to the service provider and determines again a new service type for the user object according to the steps S1904-S1906 of FIG. 19 or the steps S2004-S2006 of FIG. 20.

In step S2220 the service processing portion 1800 continues receiving the interrupted service of the new service type from the service provider, and the service information redistributing portion 1808 determines the new device objects/combination of the device objects.

Then step S2222 continues providing service information of the new service type for the user object by using the newly determined device objects/combination of the device objects.

When in step S2206 it is judged that the number of the device objects increases, as this will not affect the service information providing operation, thus the process terminates. But those skilled in the art can recognize that when the number of the device objects increases, it is possible that the negotiating portion 1802 determines again a service type based on the added device object for the user object so as to enhance the service quality.

When in step S2206 it is judged that the favorite information of the user object has changed, the process proceeds to step S2224 to judge whether this change will affect the selection of the current device objects/combination of the device objects used to accept the service information. When there is no affection, the processing terminates. Otherwise the process proceeds to step S2210 to do further processing.

Thus, the virtual device according to the present invention can adjust the form of providing the services based on the change of the user sentient network information so as to provide a more flexible information providing form to dynamically suit the instant user environment or instant user requirements.

The virtual device according to the present invention can selects a suitable information presentation form for the service information sent to the user from the side of the service provider and presents it to the user.

Figure 23:
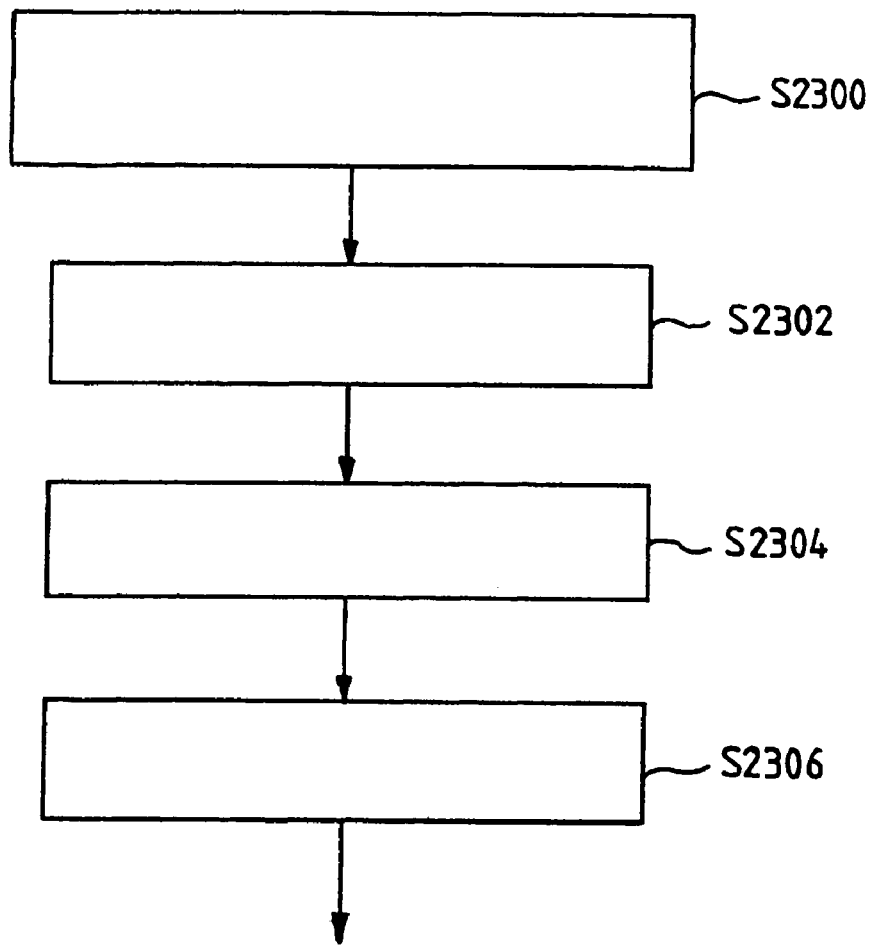
FIG. 23 depicts a further processing flow diagram of an embodiment of the present invention, wherein the virtual device selects a service type for a user object.

FIG. 23 shows a processing flow diagram, wherein the service information is sent to the user from the side of the service provider.

Firstly, in step S2300 the service provider sends a notice to the negotiating portion 1802 of planning to send the service information to the user object and sends the service types to be provided and the corresponding device object capabilities requirements information to the negotiating portion 1802.

In step S2302, in response to the receipt of the notice, the negotiating portion 1802 requests the monitoring portion 1806 to send the sentient network information of the user object via the controlling portion 1804.

In step S2304, in response to the receipt of the request, the monitoring portion 1806 obtains the available device object information and/or the user object information from the sentient network of the user object via the interface portion 1810.

Then the obtained device object information is sent to the negotiating portion 1802 via the controlling portion 1804.

In step S2306 the negotiating portion 1802 selects a service type suiting the capabilities of the available device object from the service types provided by the service provider based on the device object information received from the monitoring portion 1806 and notifies the service provider of the selected service type.

Optionally, in the above selection process it is possible to determine a service type with reference to the personal tailoring requirements of the user.

For example, the currently available device objects can be further filtered based on the user favorite information of the device to accept the services obtained preliminarily from the user object by the monitoring portion 1806 or obtained by querying the user, the favorite information may be for example what physical devices the user prefers to use in accepting the video services, what devices to use in accepting the audio services and so on. Then a service type suiting the capabilities of the filtered available device object is selected from the service types provided by the service provider.

Optionally, the negotiating portion 1802 may select preliminarily some service types suiting the capabilities of the available device object from the service types provided by the service provider, and then determines a service type by querying the user object, or further determines a service type with reference to, for example, the service requirements of the user in the favorite information of the user object.

Then the service information is sent to the user object according to the flow diagram shown in FIG. 21.

Figure 24:
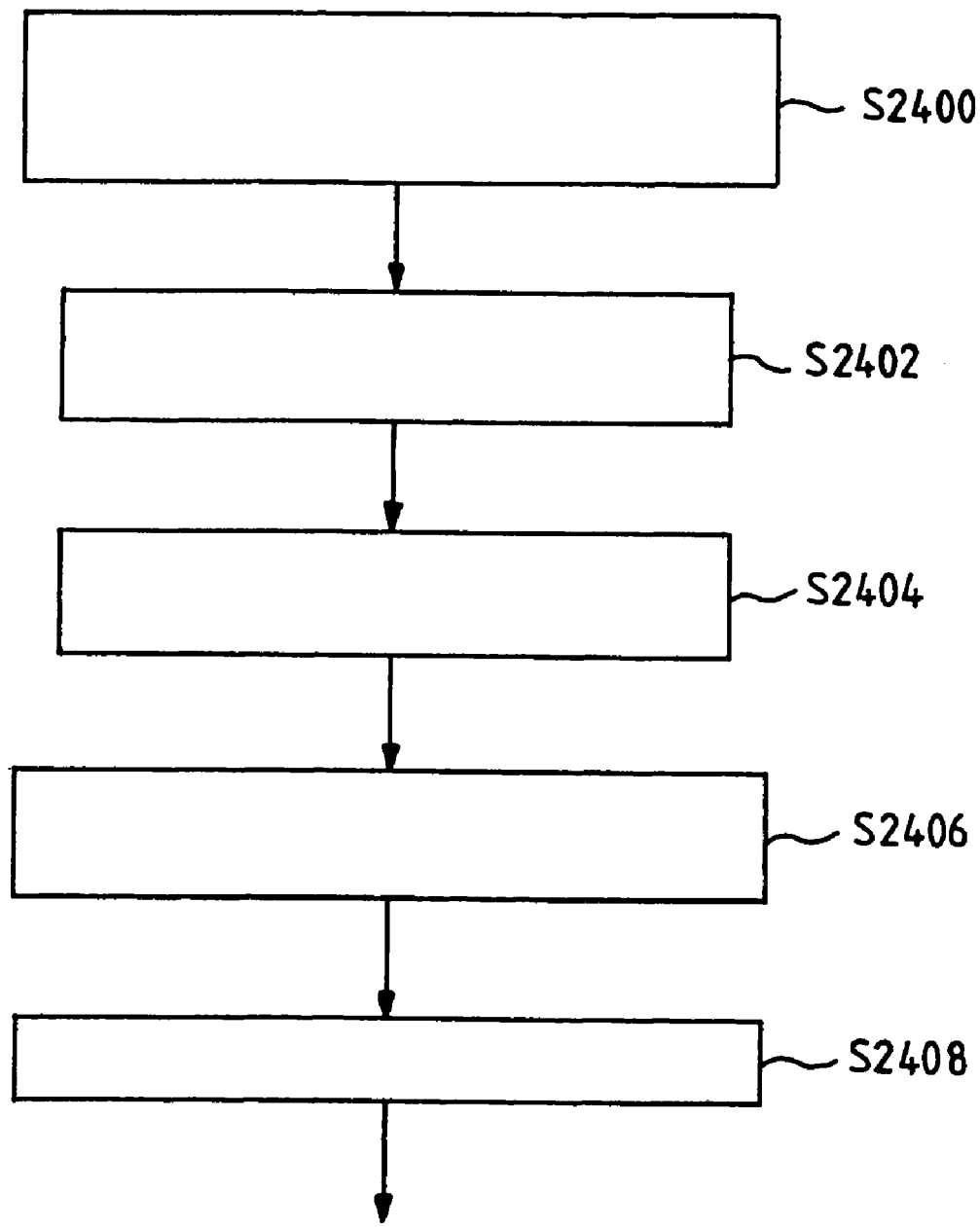
FIG. 24 depicts another further processing flow diagram of an embodiment of the present invention, wherein the virtual device selects a service type for a user object.

FIG. 24 shows another processing flow diagram, wherein the service information is sent to the user from the side of the service provider.

Firstly, in step S2400 the service provider sends a notice to the negotiating portion 1802 of planning to send the service information to the user object.

In step S2402, in response to the receipt of the notice, the negotiating portion 1802 requests the monitoring portion 1806 to send the sentient network information of the user object via the controlling portion 1804.

In step S2404, in response to the receipt of the request, the monitoring portion 1806 obtains the available device object information and/or the user object information from the sentient network of the user object via the interface portion 1810. Then the obtained device object information is sent to the negotiating portion 1802 via the controlling portion 1804.

In step S2406, the negotiating portion 1802 sends the sentient network information received from the monitoring portion 1806 to the corresponding service provider to ask the service provider to determine one or more service types which can satisfy the service information based on the device information in the sentient network.

In step S2408, in response to the service type information received from the service provider, the negotiating portion 1802 selects a service type for the user and notifies the service provider of the selected service type.

Optionally, in the above step S2406, the currently available device objects can be further filtered based on the user favorite information of the device to accept the services obtained from the user object preliminarily by the monitoring portion 1806 or obtained by querying the user, then the filtered device object capabilities information are provided to the service provider.

Optionally, in step S2408 the negotiating portion 1802 may provide a plurality of service types provided by the service provider to the user, and then determines a service type by querying the user object, or further determines a service type with reference to, for example, the service requirements of the user in the favorite information of the user object.

Then the service information is sent to the user object according to the flow diagram shown in FIG. 21.

Optionally, the virtual device of the present invention specially sends the various parts of the virtual device and the interactive control information between the service provider and the users to a physical device of the user to use the physical device as a "remote controller" for the user controlling purpose. Thus, the controlling portion 1804 of the present invention may include a control information management portion (not shown) used to send the control information to be sent to the user to a device designated by the user or to a device selected from the available devices by the virtual device via a control information interaction interface (not shown), on which the control information displayed can be used by the user to operate all the other devices. The control information sent by the user to the virtual device is also transferred by the control information management portion, via the control information interaction interface, to the monitoring portion, the negotiating portion or the service processing portion.

Furthermore, the virtual device of the present invention can further select a suitable service type used to provide services for the users based on the service information provided by the service provider.

It is to be noted that the above described implementations are only used for illustrating the present invention and should not be used to limit the present invention.

Moreover, the above-mentioned operating processes may be implemented in the form of computer executable programs stored in various media. These media include but are not limited to: various storage and storing units, the semiconductor devices, the magnetic and magneto-optical disks and other media suitable for storing information.

What is claimed is:

1. A service providing method for providing services for a user, said method comprising:
   using a sentient network generating device for building a sentient network for the user by:
   collecting information of the user, the plurality of the physical devices available to the user, and an environment related to the user;
   generating a device object for each physical device available to the user, said device object comprising a data item with identifying information of the physical device;
   generating a user object for the user, said user object comprising a device data item comprising identifying information for each device object;
   constructing a virtual world with the user object, the device objects and the environmental information;
   associating the user object with the device objects, wherein the associating comprises matching the identifying information of the device objects in the device data item of the user object with the identifying information in the data item of the device objects; and
   generating a virtual device operating environment for the user based on the information from the sentient network, wherein said virtual device operating environment comprises a virtual device serving as a service interface between the user and a service provider;
   wherein the sentient network includes a user object and one or more device objects available to the user object, the sentient network generating device comprising: a user management portion for receiving the registration request of at least one user and for building the user object(s) for the user(s); a device management portion for receiving the registration request of at least one device and for building the device object(s) for the device(s); an associating portion for associating a user object with at least one of the device object(s) to generate a sentient network;

using the virtual device for:

receiving a service request sent from the user object desiring a service from the service provider;

sending the service request and the information from the sentient network to the service provider to ask the service provider to provide a service type information and the device object capabilities requirements information of the service types that can satisfy the service request;

selecting one service type from the service types of the services provided by the service provider;

determining the device object to receive the service information based on the device object capabilities; and distributing the service information to the determined device object for processing.

2. The service providing method of claim 1 wherein the step of selecting the one service type comprises:

receiving the service type information and the device object capabilities requirement from the service provider;

selecting the service type suiting the capabilities of available device objects from the service types provided by the service provider based on the device object information;

notifying the service provider of the selected service type; and obtaining the available device object information from the sentient network.

3. The service providing method of claim 2 wherein selecting the service type further comprises basing said selection on the user object information.

4. The service providing method of claim 2 further comprising obtaining the user object information from the sentient network.

5. The service providing method of claim 4 wherein obtaining the user object information comprises obtaining user favorite information.

6. The service providing method of claim 2 further comprising:

filtering the available device objects based on user favorite information of the device to accept the services obtained from the user object.

7. The service providing method of claim 1 wherein using the sentient network generating device further comprises monitoring whether available physical service information and the user information has changed.

8. The service providing method of claim 7 further comprising determining a new service type for the user when the available physical service information has changed.

* * * * *